(12) United States Patent
Park et al.

(10) Patent No.: US 12,452,811 B2
(45) Date of Patent: Oct. 21, 2025

(54) METHOD AND APPARATUS FOR SIDELINK SYNCHRONIZATION SIGNAL TRANSMISSION AND RECEPTION IN COMMUNICATION SYSTEM BASED ON UNLICENSED BAND

(71) Applicant: Samsung Electronics Co., Ltd., Suwon-si (KR)

(72) Inventors: Sungjin Park, Suwon-si (KR); Hyunseok Ryu, Suwon-si (KR); Kyoungmin Park, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/315,094

(22) Filed: May 10, 2023

(65) Prior Publication Data
US 2023/0370987 A1 Nov. 16, 2023

(30) Foreign Application Priority Data
May 12, 2022 (KR) .................... 10-2022-0058598

(51) Int. Cl.
*H04W 56/00* (2009.01)
*H04W 16/14* (2009.01)
*H04W 92/18* (2009.01)

(52) U.S. Cl.
CPC ....... *H04W 56/0015* (2013.01); *H04W 16/14* (2013.01); *H04W 92/18* (2013.01)

(58) Field of Classification Search
CPC . H04W 72/25; H04W 74/0808; H04W 92/18; H04W 72/40; H04W 16/14;
(Continued)

(56) References Cited

U.S. PATENT DOCUMENTS

| 2023/0413270 A1* | 12/2023 | Park | H04W 8/22 |
| 2024/0372670 A1* | 11/2024 | Guo | H04L 5/0033 |
| 2025/0193904 A1* | 6/2025 | Chen | H04W 72/0446 |

FOREIGN PATENT DOCUMENTS

| KR | 10-2021-0153976 A | 12/2021 |
| WO | 2021/237654 A1 | 12/2021 |

OTHER PUBLICATIONS

Futurewei, 'Discussion of physical channel designs for sidelink transmission in unlicensed spectrum', R1-2204098, 3GPP TSG RAN WG1 Meeting #109-e, e-Meeting, Apr. 29, 2022.
(Continued)

*Primary Examiner* — Diane D Mizrahi
*Assistant Examiner* — Jing Gao
(74) *Attorney, Agent, or Firm* — Jefferson IP Law, LLP

(57) ABSTRACT

A method performed by a user equipment (UE) in a wireless communication system is provided. The method includes identifying whether a frequency band in which the UE operates corresponds to an unlicensed spectrum or a licensed spectrum, identifying a period for a transmission of a sidelink synchronization signal block (S-SSB) and a subcarrier spacing associated with the S-SSB, identifying a number of S-SSB transmissions within the period, and in case that the frequency band corresponds to the unlicensed spectrum, transmitting at least two S-SSBs, wherein the number of S-SSB transmissions relates to the subcarrier spacing and depends on whether the frequency band corresponds to the unlicensed spectrum or the licensed spectrum, and wherein a number of S-SSB transmissions in a case of the frequency band corresponding to the unlicensed spectrum is greater than a number of S-SSB transmissions in a case of the frequency band corresponding to the licensed spectrum.

10 Claims, 19 Drawing Sheets

(d) Inter-cell SL communication scenario

(58) Field of Classification Search
CPC . H04W 76/14; H04W 48/10; H04W 56/0015; H04W 56/0025; H04W 72/569; H04W 4/40; H04W 52/0216; H04W 72/0446; H04W 72/0453; H04W 72/12; H04W 72/1215; H04W 72/563; H04W 74/002; H04W 76/28; H04L 1/1854; H04L 5/001; H04L 5/0094; H04L 1/189; H04L 2001/0092; H04L 1/1864; H04L 5/0007; H04L 5/0044; H04L 5/0048; H04L 5/0055

See application file for complete search history.

(56) References Cited

OTHER PUBLICATIONS

Lenovo, 'Physical layer design framework for sidelink on FR1 unlicensed spectrum', R1-2203704, 3GPP TSG RAN WG1 #109-e, e-Meeting, Apr. 29, 2022.
Oppo, 'Access mechanisms of NR sidelink in unlicensed channel', R1-2203982, 3GPP TSG-RAN WG1 Meeting #109-e, Apr. 29, 2022.
Wilus Inc., 'Discussion on channel access mechanism for SL on unlicensed spectrum', R1-2204552, 3GPP TSG RAN WG1 #109-e, Apr. 30, 2022.
International Search Report dated Aug. 4, 2023, issued in International Application No. PCT/KR2023/006329.

* cited by examiner (a) In-coverage scenario (b) Partial coverage scenario (c) Out-of-coverage scenario

METHOD AND APPARATUS FOR SIDELINK SYNCHRONIZATION SIGNAL TRANSMISSION AND RECEPTION IN COMMUNICATION SYSTEM BASED ON UNLICENSED BAND

CROSS-REFERENCE TO RELATED APPLICATION(S)

This application is based on and claims priority under 35 U.S.C. § 119(a) of a Korean patent application number 10-2022-0058598, filed on May 12, 2022, in the Korean Intellectual Property Office, the disclosures of which is incorporated by reference herein in its entirety.

BACKGROUND

1. Field

The disclosure relates to transmission and reception of sidelink information in a wireless communication system. More particularly, the disclosure relates to a configuration of sidelink information in an unlicensed band and a method and apparatus for transmitting and receiving the same.

2. Description of Related Art $5^{th}$ generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement $6^{th}$ generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for configuring sidelink broadcast information in a sidelink communication system and a method and apparatus for transmitting and receiving the same.

Another aspect of the disclosure is to provide a method for allocating resources for sidelink synchronization signal block (S-SSB) transmission.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes identifying whether a frequency band in which the UE operates corresponds to an unlicensed spectrum or a licensed spectrum, identifying a period for a transmission of an S-SSB and a subcarrier spacing associated with the S-SSB, identifying a number of S-SSB transmissions within the period, and in case that the frequency band corresponds to the unlicensed spectrum, transmitting at least two S-SSBs based on the number of S-SSB transmissions, wherein the number of S-SSB transmissions relates to the subcarrier spacing and depends on whether the frequency band corresponds to the unlicensed spectrum or the licensed spectrum, and wherein a number of S-SSB transmissions in a case of the frequency band corresponding to the unlicensed spectrum is greater than a number of S-SSB transmissions in a case of the frequency band corresponding to the licensed spectrum.

In accordance with another aspect of the disclosure, a UE in a wireless communication system is provided. The UE includes a transceiver and a controller coupled with the transceiver, wherein the controller is configured to identify whether a frequency band in which the UE operates corresponds to an unlicensed spectrum or a licensed spectrum, identify a period for a transmission of an S-SSB and a subcarrier spacing associated with the S-SSB, identify a number of S-SSB transmissions within the period and in case that the frequency band corresponds to the unlicensed spectrum, transmit at least two S-SSBs based on the number of S-SSB transmissions, wherein the number of S-SSB transmissions relates to the subcarrier spacing and depends on whether the frequency band corresponds to the unlicensed spectrum or the licensed spectrum, and wherein a number of S-SSB transmissions in a case of the frequency band corresponding to the unlicensed spectrum is greater than a number of S-SSB transmissions in a case of the frequency band corresponding to the licensed spectrum.

In accordance with another aspect of the disclosure, a method performed by a UE in a wireless communication system is provided. The method includes identifying whether a frequency band in which the UE operates corresponds to an unlicensed spectrum or a licensed spectrum, identifying a period for a transmission of an S-SSB and a subcarrier spacing associated with the S-SSB, and in case that the frequency band corresponds to the unlicensed spectrum, receiving, from a another UE, at least two S-SSBs based on a number of S-SSB transmissions within the period, wherein the number of S-SSB transmissions relates to the subcarrier spacing and depends on whether the frequency band corresponds to the unlicensed spectrum or the licensed spectrum, and wherein a number of S-SSB transmissions in a case of the frequency band corresponding to the unlicensed spectrum is greater than a number of S-SSB transmissions in a case of the frequency band corresponding to the licensed spectrum.

In accordance with another aspect of the disclosure, a UE in a wireless communication system is provided. The UE includes a transceiver and a controller coupled with the transceiver, wherein the controller is configured to identify whether a frequency band in which the UE operates corresponds to an unlicensed spectrum or a licensed spectrum, identify a period for a transmission of an S-SSB and a subcarrier spacing associated with the S-SSB, and in case that the frequency band corresponds to the unlicensed spectrum, receive, from a another UE, at least two S-SSBs based on a number of S-SSB transmissions within the period, wherein the number of S-SSB transmissions relates to the subcarrier spacing and depends on whether the frequency band corresponds to the unlicensed spectrum or the licensed spectrum, and wherein a number of S-SSB transmissions in a case of the frequency band corresponding to the unlicensed spectrum is greater than a number of S-SSB transmissions in a case of the frequency band corresponding to the licensed spectrum.

The technical problems to be achieved in the embodiment of the disclosure are not limited to the technical problems mentioned above, and other technical problems not mentioned herein will be clearly understood from the following description by those skilled in the art to which the disclosure belongs.

According to an embodiment of the disclosure, it is possible to improve efficiency in a method for configuring sidelink broadcast information in a sidelink communication system and a process of transmitting and receiving the same.

Further, according to an embodiment of the disclosure, resources for S-SSB transmission can be efficiently used in an unlicensed band.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
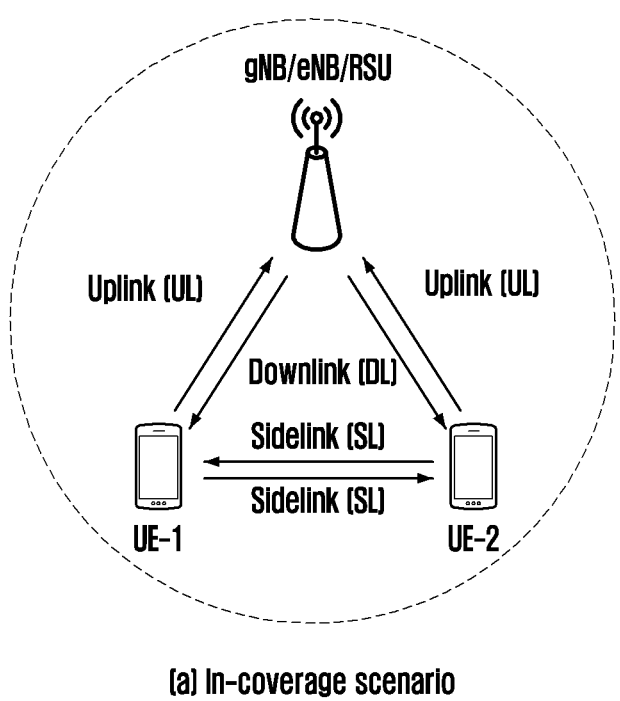
FIG. 1A illustrates an example of an in-coverage scenario in which all V2X UEs are located within the coverage of a base station in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, a "unit" may include one or more processors.

Embodiments of the disclosure will be described herein focusing a wireless access network, i.e., new radio (NR), and a packet core, i.e., a 5G system, a 5G core network, or a next generation (NG) core, according to the 5G mobile communication standard specified by the 3rd generation partnership project (3GPP) which is a mobile communication standardization organization. However, the subject matter of the disclosure can be also applied to other communication systems having similar technical backgrounds through slight modification without departing from the scope of the disclosure as will be apparent to those skilled in the art.

In the 5G system, a network data collection and analysis function (NWDAF), which is a network function of collecting, analyzing, and providing data in the 5G network, may be defined so as to support network automation. The NWDAF may collect information from the 5G network, store and analyze the collected information, and provide a result of analysis to an unspecified network function (NF). The result of analysis may be used independently in each NF.

Some terms and names defined in the 3GPP standards (e.g., 5G, NR, long term evolution (LTE), or similar system standards) will be used for the convenience of description. However, the disclosure is not limited by such terms and names, and may be also applied to any other system that complies with any other standard.

Further, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

To meet the demand for wireless data traffic having increased since deployment of $4^{th}$ generation (4G) communication systems, efforts have been made to develop an improved 5G communication system (NR, new radio). To accomplish higher data rates, the 5G communication system is designed to enable resources in extremely high frequency (mmWave) bands (e.g., 28 GHz frequency band). To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system. In addition, unlike the LTE, the 5G communication system supports various subcarrier spacings such as 15 kilohertz (kHz), 30 kHz, 60 kHz, and 120 kHz, uses a polar coding for a physical control channel, and uses a low density parity check (LDPC) for a physical data channel. Besides, cyclic prefix orthogonal frequency division multiplexing (CP-OFDM) as well as discrete Fourier transform-spread orthogonal frequency division multiplexing (DFT-S-OFDM) are used as a waveform for uplink transmission. The LTE supports hybrid ARQ (HARQ) retransmission in units of a transport block (TB), whereas the 5G can additionally support HARQ retransmission based on a code block group (CBG) in which a plurality of code blocks (CBs) are bundled.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas. Application of a cloud radio access network (cloud RAN) as the above-described big data processing technology may also be considered to be as an example of convergence between the 5G technology and the IoT technology. As such, a great variety of services may be provided to users in the communication system. In order to provide such services to users, a method and apparatus for providing respective services within the same time interval are required. One of such services provided in the 5G communication system is a service that satisfies requirements of low latency and high reliability.

In the case of vehicle communication, LTE-based V2X has been standardized in 3GPP Rel-14 and Rel-15 on the basis of a device-to-device (D2D) communication structure, and efforts are currently underway to develop V2X based on 5G NR. The NR V2X supports unicast communication, groupcast (or multicast) communication, and broadcast communication between UEs. In addition, unlike the LTE V2X that aims to transmit and receive basic safety information required for road driving of a vehicle, the NR V2X aims to provide more advanced services such as platooning, advanced driving, extended sensors, and remote driving.

Since the above-described advanced services require a higher data rate, the NR V2X system may need a wider bandwidth compared to the conventional 4G LTE V2X system. To this end, it is necessary to support operation in a high frequency band and also solve a coverage problem caused by frequency characteristics through analog beamforming. In such an analog beamforming system, a method and apparatus for acquiring beam information between a transmitting UE and a receiving UE are required.

Embodiments of the disclosure are proposed to support the above-described scenario and aim to provide a method of configuring sidelink broadcast information to perform sidelink synchronization between UEs and a method and apparatus for transmitting/receiving the same.

FIGS. 1A, 1B, 1C, and 1D are diagrams illustrating systems according to various embodiments of the disclosure.

FIG. 1A shows an example of a case in which all V2X UEs (e.g., UE-1 and UE-2) are located within the coverage of a base station in a wireless communication system according to an embodiment of the disclosure. The example shown in FIG. 1A may be referred to as an example of an in-coverage scenario.

Referring to FIG. 1A, all the V2X UEs located within the coverage of the base station are capable of receiving data and control information from the base station through a downlink (DL) or transmitting data and control information to the base station through an uplink (UL). Such data and control information may be for V2X communication or for general cellular communication. In addition, the V2X UEs are capable of transmitting/receiving data and control information for V2X communication through a sidelink (SL).

Figure 1B:
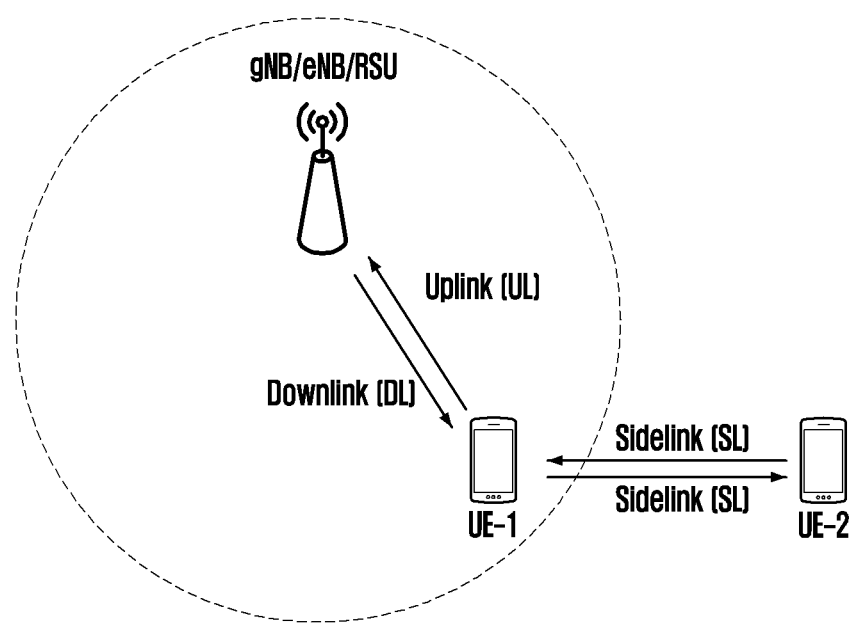
FIG. 1B illustrates an example of a partial coverage scenario in which some V2X UEs are located outside the coverage of a base station in a wireless communication system according to an embodiment of the disclosure.

FIG. 1B shows an example of a case in which some (e.g., UE-1) of V2X UEs are located within the coverage of a base station and the others (e.g., UE-2) are located outside the coverage of the base station in a wireless communication system according to an embodiment of the disclosure. The example shown in FIG. 1B may be referred to as an example of a partial coverage scenario.

Referring to FIG. 1B, the V2X UE-1 located within the coverage of the base station is capable of receiving data and control information from the base station through the downlink or transmitting data and control information to the base station through the uplink. The V2X UE-2 located out of the coverage of the base station is incapable of receiving data and control information from the base station through the downlink and incapable of transmitting data and control information to the base station through the uplink. The V2X UE-2 is capable of transmitting/receiving data and control information for V2X communication to/from the UE-1 through the sidelink.

Figure 1C:
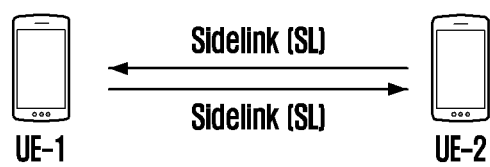
FIG. 1C illustrates an example of an out-of-coverage scenario in which all V2X UEs are located outside the coverage of a base station according to an embodiment of the disclosure.

FIG. 1C shows an example of a case in which all V2X UEs are located outside the coverage of the base station in a wireless communication system according to an embodiment of the disclosure. The example shown in FIG. 1C may be referred to as an example of an out-of-coverage scenario.

Referring to FIG. 1C, the UE-1 and UE-2 are incapable of receiving data and control information from the base station through the downlink and incapable of transmitting data and control information to the base station through the uplink. The UE-1 and UE-2 are capable of transmitting/receiving data and control information for V2X communication through the sidelink.

Figure 1D:
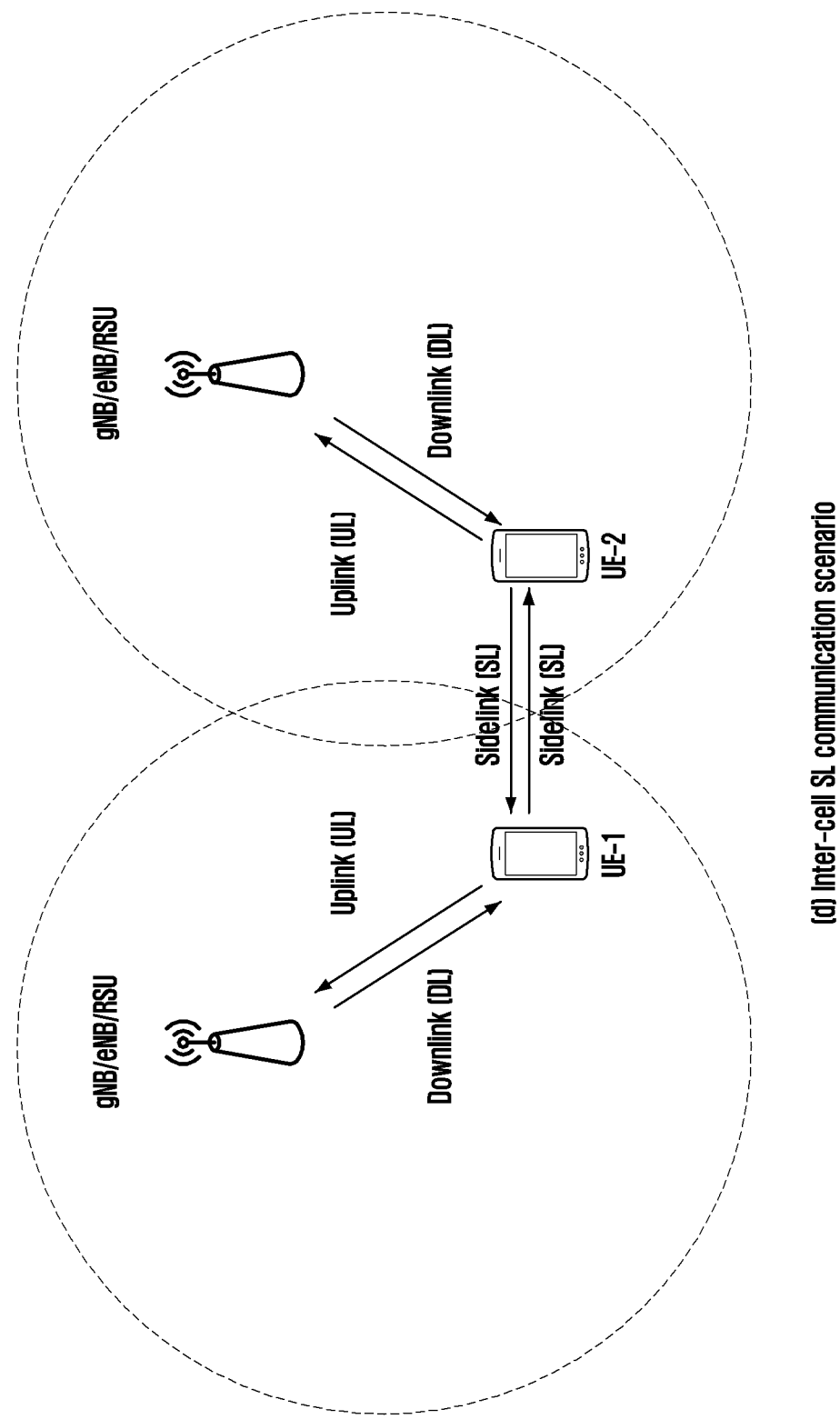
FIG. 1D illustrates an example of a scenario in which UEs located in different cells perform V2X communication with each other according to an embodiment of the disclosure.

FIG. 1D illustrates an example of a scenario in which UEs located in different cells perform V2X communication with each other in a wireless communication system according to an embodiment of the disclosure.

FIG. 1D shows a case where a V2X transmitting UE and a V2X receiving UE are connected to different base stations (an RRC connected state) or are camping on (an RRC connection released state, i.e., an RRC idle state). In this case, the UE-1 may be a V2X transmitting UE, and the UE-2 may be a V2X receiving UE. Alternatively, the UE-1 may be a V2X receiving UE, and the UE-2 may be a V2X transmitting UE. The UE-1 may receive a V2X dedicated system information block (SIB) from a base station which the UE-1 is connected to (or camping on). The UE-2 may receive a V2X dedicated SIB from another base station which the UE-2 is connected to (camping on). In this case, information of the V2X dedicated SIB received by the UE-1 and information of the V2X dedicated SIB received by the UE-2 may be identical with or different from each other. When both of the SIB information are different from each other, each of the UE-1 and the UE-2 may receive different information for sidelink communication as SIBs from the base station which it is connected to (or camping on). In this case, it is necessary to unify information in order to perform sidelink communication between UEs located in different cells.

Although FIGS. 1A to 1D illustrate a V2X system composed of two UEs (UE-1 and UE-2) for convenience of description, this is not a limitation of the disclosure. In addition, an uplink and a downlink between a base station and a V2X UE may be referred to as a Uu interface, and a sidelink between V2X UEs may be referred to as a PC5 interface. Therefore, in the disclosure, such terms may be used interchangeably.

Meanwhile, in the disclosure, the UE may refer to a device that supports a device-to-device (D2D) communication, a vehicle that supports vehicle-to-vehicle (V2V) communication, a vehicle or a pedestrian's handset (e.g., a smartphone) that supports vehicle-to-pedestrian (V2P) communication, a vehicle that supports vehicle-to-network (V2N) communication, or a vehicle that supports vehicle-to-infrastructure (V2I) communication. In addition, the UE may refer to a road side unit (RSU) having a UE function, an RSU having a base station function, or an RSU having a part of the base station function and a part of the UE function.

In the disclosure, the V2X communication may refer to communication between UEs, communication between vehicles, or communication between a vehicle and a pedestrian, and may be used interchangeably with sidelink communication.

Also, in the disclosure, the base station is defined as a base station that supports both V2X communication and general cellular communication, or a base station that supports only V2X communication. The base station may refer to a 5G base station (gNB), a 4G base station (eNB), or an RSU. Unless otherwise specified in the disclosure, the base station and the RSU may be used interchangeably.

Figure 2:
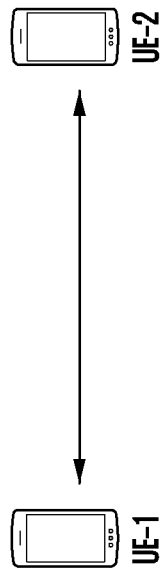
FIG. 2 illustrates a V2X communication method performed through sidelink according to an embodiment of the disclosure.
Figure 2:
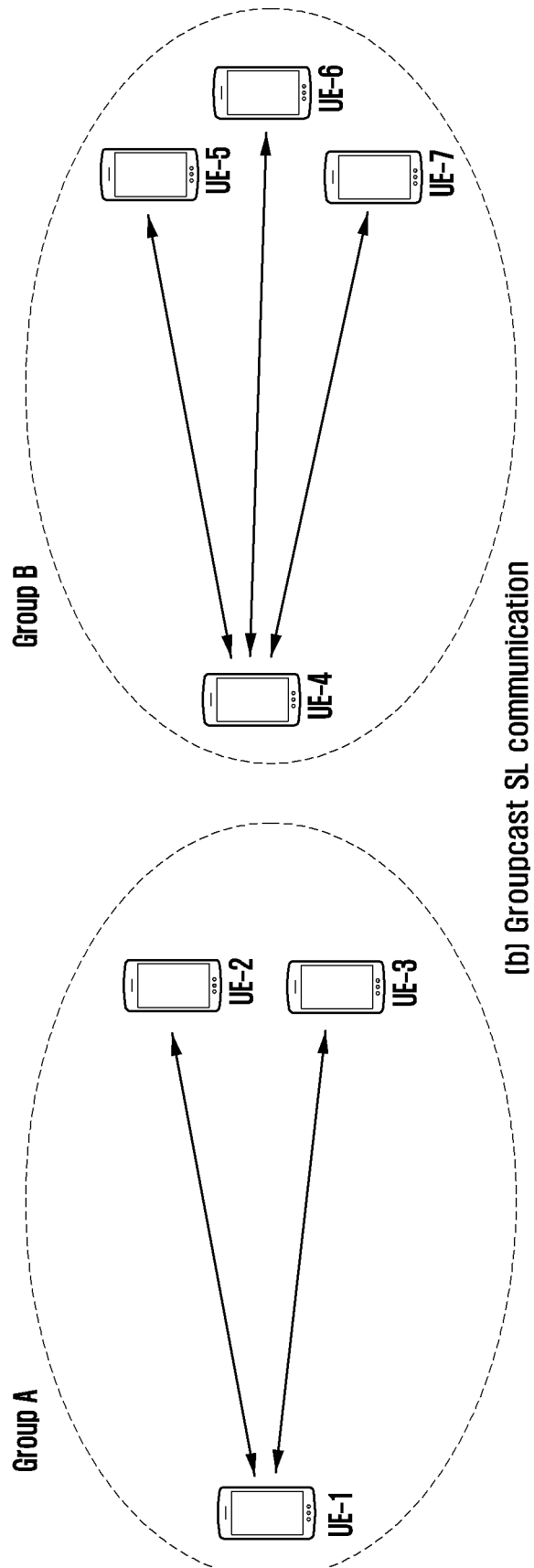

FIG. 2 illustrates a V2X communication method performed through sidelink according to an embodiment of the disclosure.

Referring to part (a) of FIG. 2, a transmitting UE (e.g., UE-1) and a receiving UE (e.g., UE-2) may perform one-to-one communication, which may be referred to as unicast communication.

Referring to part (b) of FIG. 2, a transmitting UE (e.g., UE-1 or UE-4) and receiving UEs (e.g., UE-2 and UE-3, or UE-5, UE-6 and UE-7) may perform one-to-many communication, which may be referred to as groupcast or multicast communication.

Referring to part (b) of FIG. 2, the UE-1, the UE-2 and the UE-3 may form one group (i.e., group A) and perform groupcast communication, and the UE-4, the UE-5, the UE-6 and the UE-7 may form another group (i.e., group B) and perform groupcast communication. Each UE performs groupcast communication only within a group to which it belongs, and communication between different groups may be performed via unicast, groupcast, or broadcast communication. Although part (b) of FIG. 2 illustrates two groups for convenience of description, this is not a limitation of the disclosure. The disclosure may also be applied to any other case where groups more than two are formed.

Although not shown in FIG. 2, V2X UEs may also perform broadcast communication. The broadcast communication refers to a case where all V2X UEs receive data and control information transmitted by a V2X transmitting UE through a sidelink. For example, in part (b) of FIG. 2, assuming that the UE-1 is a transmitting UE for broadcast, all the other UEs (e.g., the UE-2, the UE-3, the UE-4, the UE-5, the UE-6, and the UE-7) can receive data and control information transmitted by the UE-1.

The sidelink unicast, groupcast, and broadcast communication methods according to embodiments of the disclosure may be supported in the in-coverage, partial-coverage, and out-of-coverage scenarios.

Resource allocation in the sidelink system may use the following methods.

(1) Mode 1 Resource Allocation

The mode 1 resource allocation may refer to a method of resource allocation scheduled by a base station (i.e., scheduled resource allocation). Specifically, in the mode 1 resource allocation, the base station may allocate resources used for sidelink transmission to RRC-connected UEs in a dedicated scheduling scheme. The scheduled resource allocation method by the base station may be effective for interference management and resource pool management (dynamic allocation and/or semi-persistent transmission (SPS)) because the base station can manage sidelink resources. In the case of having data to transmit to other UE(s), the RRC-connected UE may transmit information notifying the base station that there is data to be transmitted to other UE(s), using a radio resource control (RRC) message or a medium access control (MAC) control element (CE). For example, the RRC message may include a sidelink UE information message and/or a UE assistance information message. In addition, the MAC CE may be a buffer status report (BSR), a scheduling request (SR), etc. which includes at least one of an indicator indicating the BSR for V2X communication or information on the size of buffered data for sidelink communication. The mode 1 resource allocation method can be applied to the case where the sidelink transmitting UE is within the coverage of the base station because the sidelink transmitting UE receives resource scheduling by the base station.

(2) Mode 2 Resource Allocation

The mode 2 resource allocation may refer to a method in which a sidelink transmitting UE autonomously selects a resource (i.e., UE autonomous resource selection). Specifically, in the mode 2 resource allocation, the base station provides a sidelink transmission/reception resource pool for sidelink to the UE via system information or an RRC message (e.g., an RRC reconfiguration message or a PC5-RRC message), and the transmitting UE that has received the transmission/reception resource pool selects a resource pool and resources in accordance with a predefined rule. The mode 2 resource allocation method can be applied to the case where the sidelink transmitting UE and receiving UE are within the coverage of the base station because the base station provides configuration information for the sidelink transmission/reception resource pool. If the sidelink transmitting UE and receiving UE exist outside the coverage of the base station, the sidelink transmitting UE and receiving UE may perform a mode 2 operation in a preconfigured transmission/reception resource pool. The UE autonomous resource selection method may include zone mapping, sensing-based resource selection, or random selection.

(3) Additionally, resource allocation or resource selection may not be performed by the scheduled resource allocation method (i.e., mode 1) or the UE autonomous resource selection method (i.e., mode 2) even if the UE is present in the coverage of the base station. In this case, the UE may perform sidelink communication through a preconfigured sidelink transmission/reception resource pool.

The sidelink resource allocation methods according to the above embodiment of the disclosure may be applied to various embodiments of the disclosure.

Figure 3:
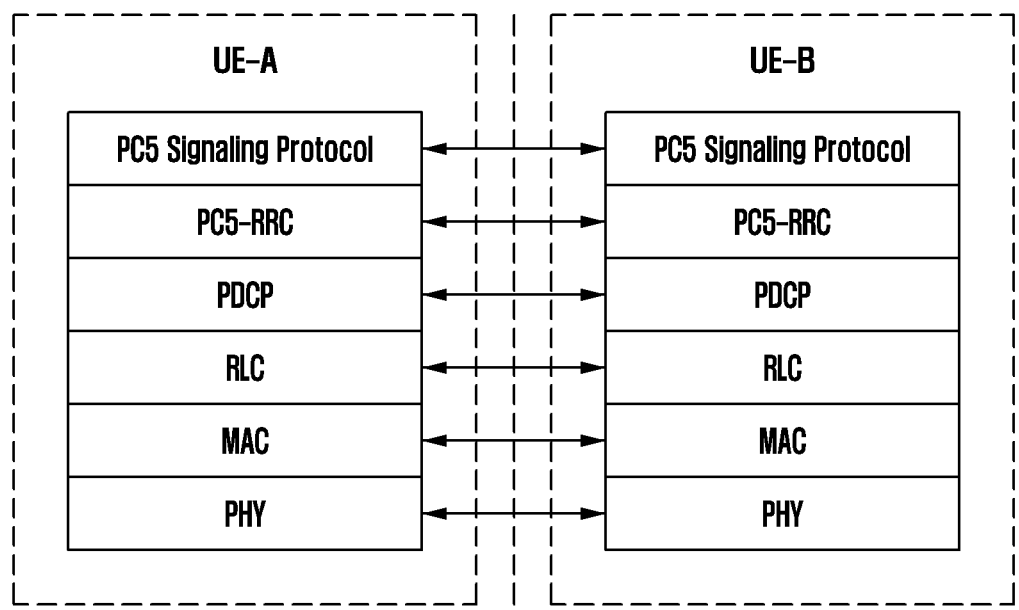
FIG. 3 illustrates a protocol of a sidelink UE according to an embodiment of the disclosure.

FIG. 3 illustrates a protocol of a sidelink UE according to an embodiment of the disclosure.

Although not shown in FIG. 3, application layers of UE-A and UE-B may perform service discovery. In this case, the service discovery may include discovery about which sidelink communication method (e.g., unicast, groupcast, or broadcast) will be performed by each UE. Therefore, in FIG. 3, assuming that UE-A and UE-B recognize through a service discovery process performed in the application layers that unicast communication method will be performed. The sidelink UEs can obtain information on a source identifier (ID) and a destination ID for sidelink communication in the service discovery process.

When the service discovery process is completed, a direct link connection setup procedure between UEs may be performed in PC-5 signaling protocol layers shown in FIG. 3. At this time, UE-A and UE-B may exchange security configuration information for direct communication between UEs.

When the direct link connection setup procedure between UEs is completed, a PC-5 radio resource control (RRC) setup procedure between UEs may be performed in the PC-5 RRC layers of FIG. 3. At this time, information on capabilities of UE-A and UE-B may be exchanged, and access stratum (AS) layer parameter information for unicast communication may be exchanged.

When the PC-5 RRC setup procedure is completed, UE-A and UE-B may perform unicast communication.

Although unicast communication is described above as an example, it may be extended to groupcast communication. For example, in the case where UE-A, UE-B, and UE-C (not shown in FIG. 3) perform groupcast communication, UE-A and UE-B may perform the service discovery for unicast communication, the direct link setup procedure between UEs, and the PC-5 RRC setup procedure as discussed above. In addition, UE-A and UE-C may also perform the service discovery for unicast communication, the direct link setup procedure between UEs, and the PC-5 RRC setup procedure. Finally, UE-B and UE-C may also perform the service discovery for unicast communication, the direct link setup procedure between UEs, and the PC-5 RRC setup procedure. That is, rather than performing a separate PC-5 RRC setup procedure for groupcast communication, each pair of transmitting and receiving UEs participating in groupcast communication may perform the PC-5 RRC setup procedure for unicast communication. However, in the groupcast method, the PC5 RRC setup procedure for unicast communication may not always have to be performed. For example, there may be a scenario of groupcast communication performed without PC5 RRC setup, and in this case, the PC5 RRC setup procedure for unicast transmission may be omitted.

The PC-5 RRC setup procedure for unicast or groupcast communication can be applied to all of the in-coverage scenario of FIG. 1A, the partial coverage scenario of FIG. 1B, and the out-of-coverage scenario of FIG. 1C. If UEs that wish to perform unicast or groupcast communication exist within the coverage of the base station, the UEs may perform the PC-5 RRC setup procedure before or after performing downlink or uplink synchronization with the base station.

Figure 4:
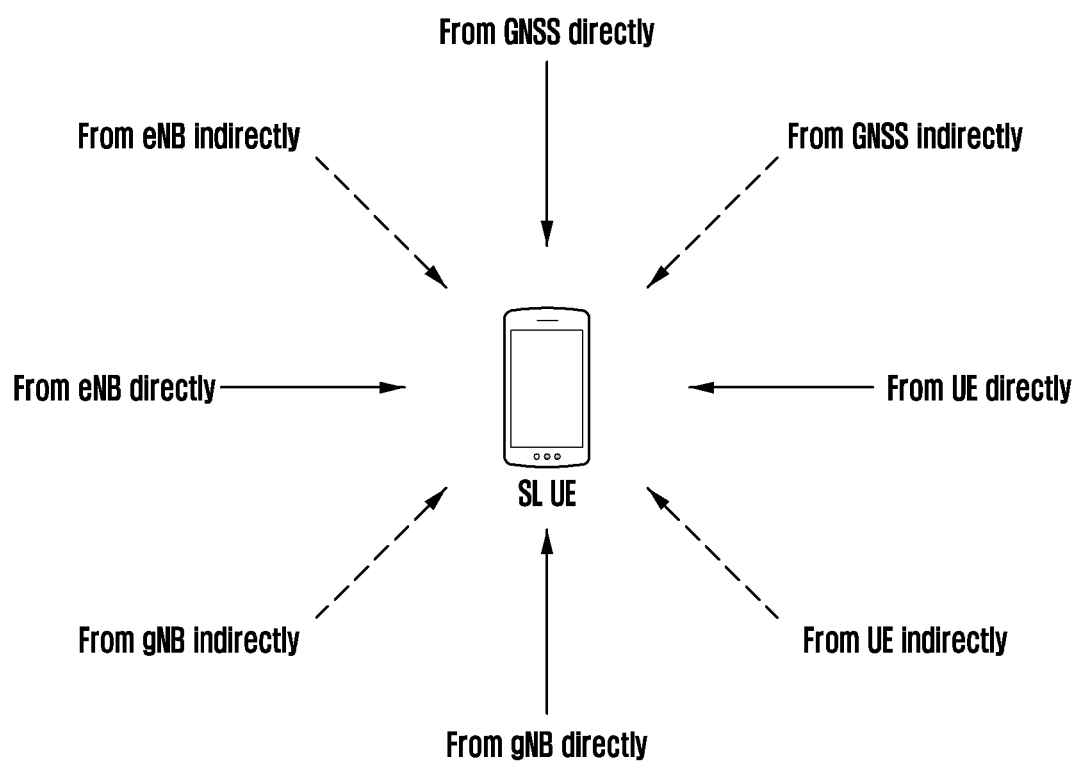
FIG. 4 illustrates types of synchronization signals that can be received by a sidelink UE according to an embodiment of the disclosure.

FIG. 4 illustrates types of synchronization signals that can be received by a sidelink UE according to an embodiment of the disclosure.

Referring to FIG. 4, a sidelink UE may receive the sidelink synchronization signals from various sidelink synchronization sources, as follows.

The sidelink UE may directly receive a synchronization signal from a Global Navigation Satellite System (GNSS) or a Global Positioning System (GPS).

In this case, the sidelink synchronization signal source may be GNSS.

The sidelink UE may indirectly receive a synchronization signal from the GNSS or the GPS.

Indirectly receiving a synchronization signal from the GNSS may refer to the case where a sidelink synchronization signal (SLSS) transmitted by a sidelink UE (e.g., UE-1) that is directly synchronized with the GNSS is received by another sidelink UE (e.g., UE-A). In this case, the sidelink UE (e.g., UE-A) that indirectly receives the synchronization signal may receive the synchronization signal from the GNSS through two hops. In another example, another sidelink UE (e.g., UE-2) (i.e., a UE that is indirectly performing synchronization from the GNSS) that is synchronized with the SLSS transmitted by the sidelink UE (e.g., UE-1) that is directly synchronized with the GNSS may transmit the SLSS. The sidelink UE (e.g., UE-A) receiving the SLSS may receive the synchronization signal from the GNSS through three hops. Similarly, the sidelink UE (e.g., UE-A) that indirectly receives the synchronization signal may receive the synchronization signal from the GNSS through more than three hops.

In this case, the sidelink synchronization signal source may be another sidelink UE (e.g., the UE-1) that is synchronized with the GNSS.

The sidelink UE may directly receive a synchronization signal from an LTE base station (eNB).

The sidelink UE may directly receive a primary synchronization signal (PSS)/secondary synchronization signal (SSS) transmitted from the eNB.

In this case, the sidelink synchronization signal source may be the eNB.

The sidelink UE may indirectly receive a synchronization signal from the eNB.

Indirectly receiving a synchronization signal from the eNB may refer to the case where the SLSS transmitted by a sidelink UE (e.g., UE-1) that is directly synchronized with the eNB is received by another sidelink UE (e.g., UE-A). In this case, the sidelink UE (e.g., UE-A) that indirectly receives the synchronization signal may receive the synchronization signal from the eNB through two hops. In another example, another sidelink UE (e.g., UE-2) (i.e., a UE that is indirectly performing synchronization from the eNB) that is synchronized with the SLSS transmitted by the sidelink UE (e.g., UE-1) that is directly synchronized with the eNB may transmit the SLSS. The sidelink UE (e.g., UE-A) receiving the SLSS may receive the synchronization signal from the eNB through three hops. Similarly, the sidelink UE (e.g., UE-A) that indirectly receives the synchronization signal may receive the synchronization signal from the eNB through more than three hops.

In this case, the sidelink synchronization signal source may be another sidelink UE (e.g., UE-1) that is synchronized with the eNB.

The sidelink UE may indirectly receive a synchronization signal from an NR base station (gNB).

Indirectly receiving a synchronization signal from the gNB may refer to the case where the SLSS transmitted by a sidelink UE (e.g., UE-1) that is directly synchronized with the gNB is received by another sidelink UE (e.g., UE-A). In this case, the sidelink UE (e.g., UE-A) that indirectly receives the synchronization signal may receive the synchronization signal from the gNB through two hops. In another example, another sidelink UE (e.g., UE-2) (i.e., a UE that is indirectly performing synchronization from the gNB) that is synchronized with the SLSS transmitted by the sidelink UE (e.g., UE-1) that is directly synchronized with the gNB may transmit the SLSS. The sidelink UE (e.g., UE-A) receiving the SLSS may receive the synchronization signal from the gNB through three hops. Similarly, the sidelink UE (e.g., UE-A) that indirectly receives the synchronization signal may receive the synchronization signal from the gNB through more than three hops.

In this case, the sidelink synchronization signal source may be another sidelink UE (e.g., UE-1) that is synchronized with the gNB.

The sidelink UE (e.g., UE-A) may directly receive a synchronization signal from another sidelink UE (e.g., UE-B).

When the sidelink UE-B fails to detect the SLSS transmitted from the GNSS, the gNB, the eNB or another sidelink UE as a synchronization signal source, the sidelink UE-B may transmit the SLSS based on its own timing. The sidelink UE-A may directly receive the SLSS transmitted by the sidelink UE-B.

In this case, the sidelink synchronization signal source may be the sidelink UE (e.g., UE-B).

The sidelink UE (e.g., UE-A) may indirectly receive a synchronization signal from another sidelink UE (e.g., UE-B).

Indirectly receiving a synchronization signal from another sidelink UE (e.g., UE-B) may refer to the case where the SLSS transmitted by the sidelink UE-1 that is directly synchronized with the sidelink UE-B is received by the sidelink UE-A. In this case, the sidelink UE-A may receive the synchronization signal from the sidelink UE-B through two hops. In another example, the sidelink UE-2 that is synchronized with the SLSS transmitted by the sidelink UE-1 that is directly synchronized with the sidelink UE-B may transmit the SLSS. The sidelink UE-A receiving the SLSS may receive the synchronization signal from the sidelink UE-B through three hops. Similarly, the sidelink UE-A may receive the synchronization signal from the sidelink UE-B through more than three hops.

In this case, the sidelink synchronization signal source may be another sidelink UE synchronized with the sidelink UE.

The sidelink UE may receive the synchronization signals from the above-described various synchronization signal sources and may perform synchronization based on the synchronization signal transmitted from the synchronization signal source having a higher priority according to preconfigured priorities.

For example, the following priorities may be configured in advance in order from a synchronization signal having a high priority to a synchronization signal having a low priority.

Case A

1) A synchronization signal transmitted directly from the GNSS>2) A synchronization signal transmitted by a UE performing synchronization directly from the GNSS>3) A synchronization signal transmitted by a UE performing synchronization indirectly from the GNSS>4) A synchronization signal transmitted directly from the eNB or the gNB (eNB/gNB)>5) A synchronization signal transmitted by a UE performing synchronization directly from the eNB/gNB>6) A synchronization signal transmitted by a UE performing synchronization indirectly from the eNB/gNB>7) A synchronization signal transmitted by a UE that is not performing synchronization directly or indirectly from the GNSS or the eNB/gNB.

Case A is an example of the case where a synchronization signal directly transmitted by the GNSS has the highest priority. Alternatively, the case where a synchronization signal transmitted by the eNB or the gNB (eNB/gNB) has the highest priority may be considered, and the following priorities may be configured in advance.

Case B

1) A synchronization signal transmitted directly from the eNB/gNB>2) A synchronization signal transmitted by a UE performing synchronization directly from the eNB/gNB>3) A synchronization signal transmitted by a UE performing synchronization indirectly from the eNB/gNB>4) A synchronization signal transmitted directly from the GNSS>5) A synchronization signal transmitted by a UE performing synchronization directly from the GNSS>6) A synchronization signal transmitted by a UE performing synchronization indirectly from the GNSS>7) A synchronization signal transmitted by a UE that is not performing synchronization directly or indirectly from the GNSS or the eNB/gNB.

Whether the sidelink UE should follow the priority of Case A or the priority of Case B may be configured by the base station or configured/defined in advance. For example, when the sidelink UE exists in the coverage of the base station (in-coverage), the base station may configure through system information (SIB) or RRC signaling whether the sidelink UE should follow the priority of Case A or Case B. If the sidelink UE exists outside the coverage of the base station (out-of-coverage), pre-configuration may be made whether the sidelink UE should perform the sidelink synchronization procedure according to which priority of Case A or Case B.

Meanwhile, in the case where the base station configures the above-described Case A to the sidelink UE through system information or RRC signaling, the base station may further configure whether the sidelink UE should consider priority 4 (the case of being synchronized with a synchronization signal transmitted directly from the eNB or the gNB (eNB/gNB)), priority 5 (the case of being synchronized with a synchronization signal transmitted by a UE performing synchronization directly from the eNB/gNB), and priority 6 (the case of being synchronized with a synchronization signal transmitted by a UE performing synchronization indirectly from the eNB/gNB) in Case A. That is, when the above-described Case A is configured, and priority 4, priority 5 and priority 6 are further configured to be considered, all priorities of the above-described Case A may be considered (i.e., from priority 1 to priority 7). On the other hand, when the above-mentioned Case A is configured, and priority 4, priority 5 and priority 6 are not configured to be considered, or when the above-described Case A is configured, and priority 4, priority 5 and priority 6 are configured to be not considered, priority 4, priority 5 and priority 6 may be omitted in the above-described Case A (i.e., only priority 1, priority 2, priority 3 and priority 7 are considered).

The sidelink synchronization signal used in the disclosure may refer to a sidelink synchronization signal block (S-SSB), which may include a sidelink primary synchronization signal (S-PSS), a sidelink secondary synchronization signal (S-SSS), and a physical sidelink broadcast channel (PSBCH). In this case, the S-PSS may be composed of a Zadoff-Chu sequence or an M-sequence, and the S-SSS may be composed of an M-sequence or a gold sequence. Similar to PSS/SSS in the cellular system, a sidelink ID may be transmitted through a combination of the S-PSS and the S-SSS or via only S-SSS rather than this combination. The PSBCH may transmit a master information block (MIB) for sidelink communication similar to a physical broadcast channel (PBCH) of the cellular system.

In the disclosure, the case where a sidelink parameter is preconfigured in the sidelink UE may be mainly applied to a scenario in which the sidelink UE is located outside the coverage of the base station (out-of-coverage scenario). The meaning that the parameter is preconfigured in the UE may be interpreted as using a value stored in the UE when the UE was shipped from the factory. In another example, it may refer to a value that the sidelink UE has accessed the base station and previously obtained and stored the sidelink parameter information through RRC configuration. In still another example, it may refer to a value that the sidelink UE has not accessed the base station but previously obtained and stored sidelink system information from the base station.

Figure 5:
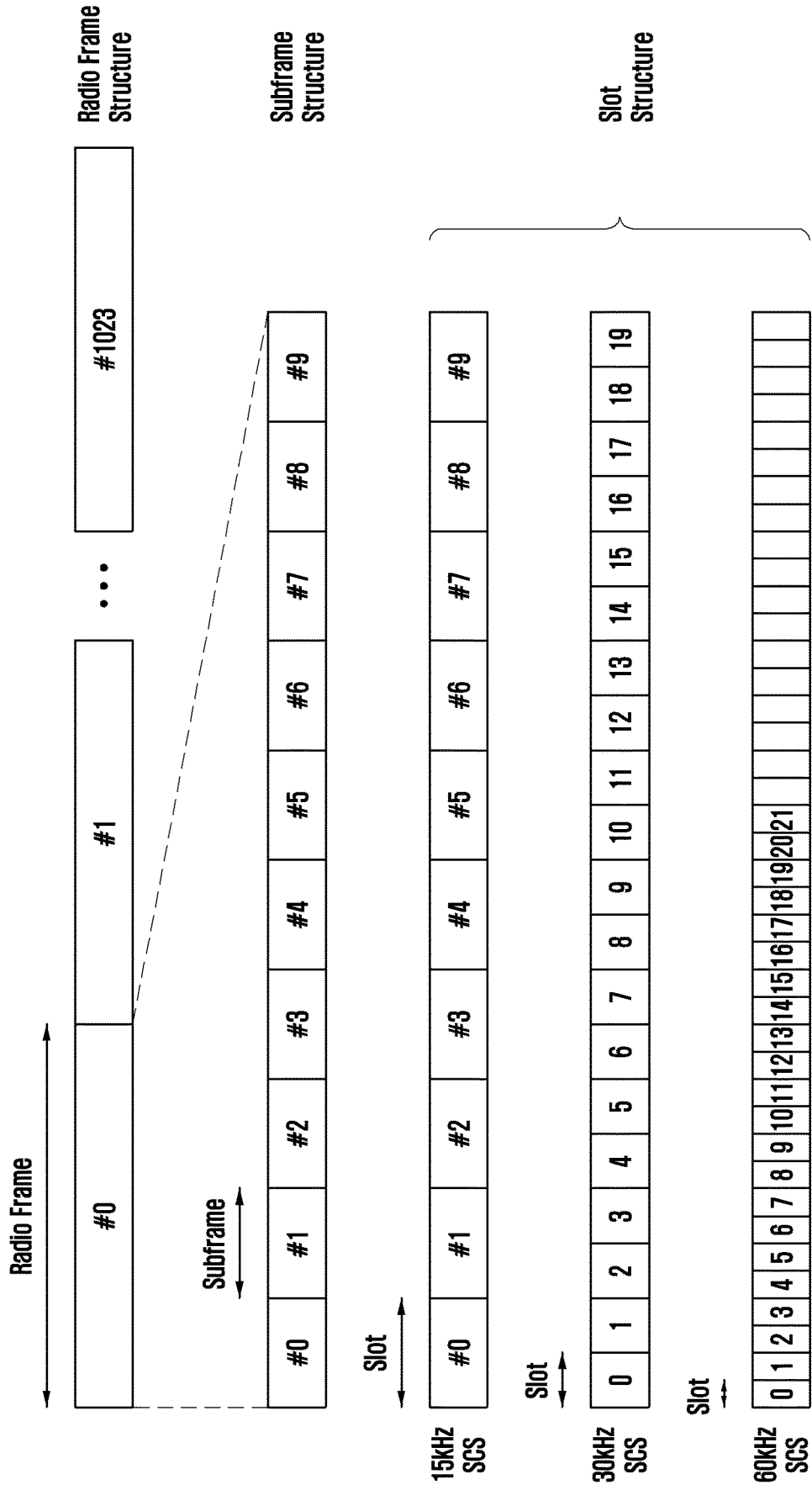
FIG. 5 illustrates a frame structure of a sidelink system according to an embodiment of the disclosure.

FIG. 5 illustrates a frame structure of a sidelink system according to an embodiment of the disclosure.

FIG. 5 shows that the system uses 1024 radio frames, but this is not a limitation. For example, a certain system may use less than or more than 1024 radio frames. How many radio frames the system uses may be configured by a base station or preconfigured. Specifically, when a sidelink UE is located in the coverage of the base station, the sidelink UE may obtain information about the radio frames through a master information block (MIB) of a PBCH transmitted by the base station. When the sidelink UE is located outside the coverage of the base station, information about the radio frames may be preconfigured in the sidelink UE.

Referring to FIG. 5, a radio frame number and a system frame number may be treated identically. That is, the radio frame number '0' may correspond to the system frame number '0', and the radio frame number '1' may correspond to the system frame number '1'. One radio frame may consist of 10 subframes, and one subframe may have a length of 1 ms on the time axis. The number of slots constituting one subframe may vary as shown in FIG. 5 depending on a subcarrier spacing used in NR V2X. For example, when a 15 kHz subcarrier spacing is used in the NR V2X communication, one subframe may be equal to one slot. However, when a 30 kHz subcarrier spacing and a 60 kHz subcarrier spacing is used in the NR V2X communication, one subframe may be equal to 2 slots and 4 slots, respectively. Although not shown in FIG. 5, this may be applied to even other cases where a subcarrier spacing of 120 kHz or more is used. That is, generalizing the number of slots constituting one subframe, the number of slots constituting one subframe may increase by 2n as the subcarrier spacing increases based on the 15 kHz subcarrier spacing, where n=0, 1, 2, 3, . . . .

Figure 6:
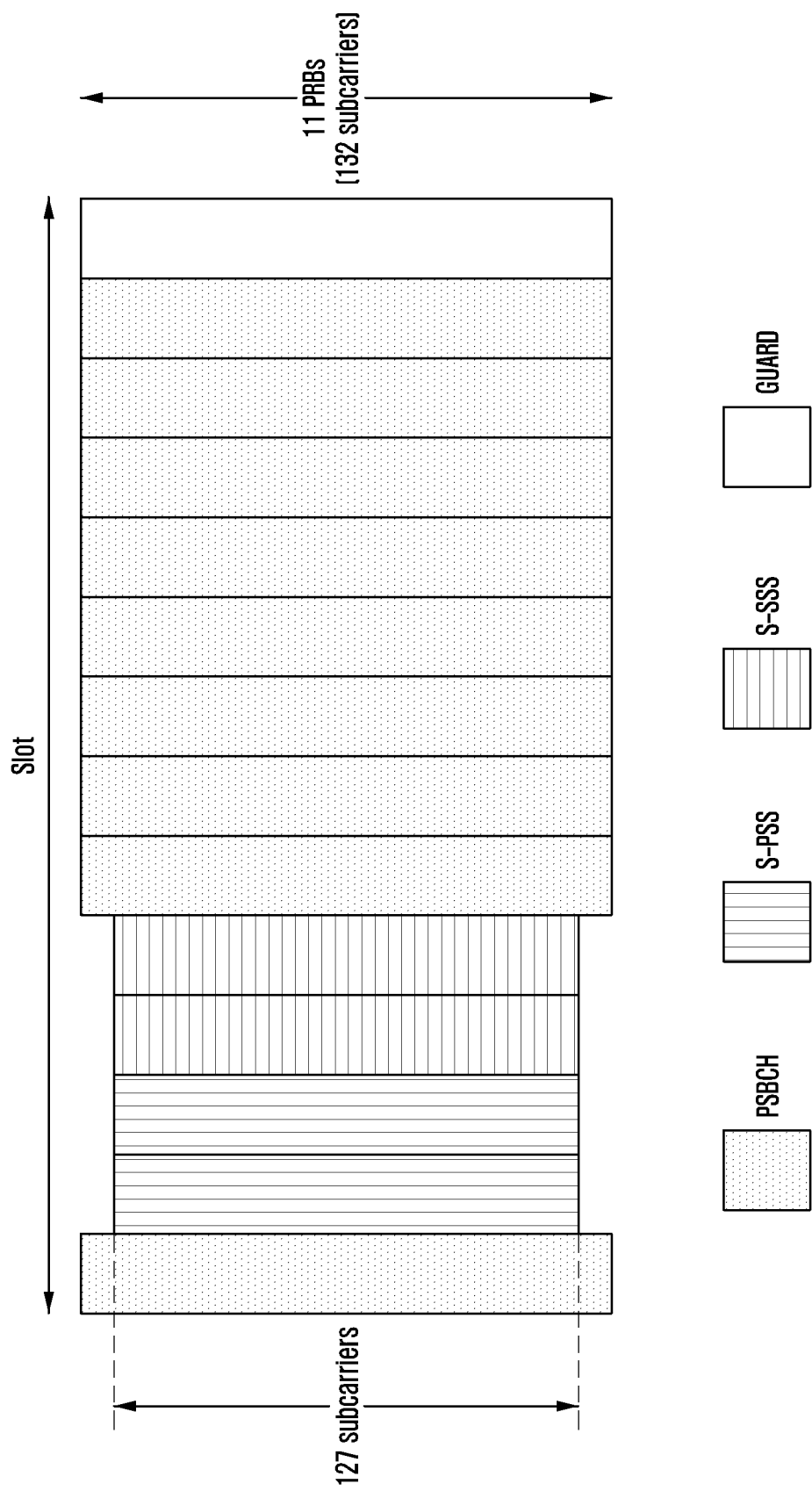
FIG. 6 illustrates a structure of a sidelink synchronization channel according to an embodiment of the disclosure.

FIG. 6 illustrates a structure of a sidelink synchronization channel according to an embodiment of the disclosure.

The sidelink synchronization channel may be expressed by being replaced with a sidelink synchronization signal block (S-SSB).

Referring to FIG. 6, one S-SSB may consist of 14 symbols in one slot. One S-SSB may be composed of a S-PSS, a S-SSS, a PSBCH, and a guard period (GAP). In this case, each of the S-PSS and S-SSS may consist of 2 OFDM symbols, the PSBCH may consist of 9 OFDM symbols, and the GAP (or GUARD) may consist of 1 OFDM symbol.

As shown in FIG. 6, the S-PSS may be mapped to OFDM symbol indexes 1 and 2, the S-SSS may be mapped to OFDM symbol indexes 3 and 4, and the GAP may be mapped to the last OFDM symbol of the S-SSB (i.e., OFDM symbol index 13). The PSBCH may be mapped to the remaining OFDM symbols except for the S-PSS, the S-SSS, and the GAP. Although FIG. 6 shows that the S-PSS and the S-SSS are located in consecutive symbols, the S-PSS and the S-SSS may be located apart with one symbol interposed therebetween. That is, the S-PSS may be mapped to OFDM symbol indexes 1 and 2, the S-SSS may be mapped to OFDM symbol indexes 4 and 5, and the PSBCH may be mapped to OFDM symbol indexes 0, 3, 6, 7, 8, 9, 10, 11, and 12. Meanwhile, although not shown in FIG. 6, a demodulation reference signal (DMRS) may be transmitted in each OFDM symbol to which the PSBCH is mapped.

Information transmitted through the PSBCH may include at least one of the following information.

1. Frame number: This may be information indicating a frame number at which the S-SSB (i.e., the S-PSS, the S-SSS and the PSBCH) is transmitted. When the sidelink UE transmitting the S-SSB is located within the coverage of the base station, the frame number may be configured based on the system frame number of the base station where the sidelink UE is located. When the sidelink UE transmitting the S-SSB is located outside the coverage of the base station, the frame number may be preconfigured based on the frame number of the UE transmitting the S-SSB. The frame number may consist of 10 bits.

2. Downlink and uplink configuration information: As shown in FIG. 1B, a sidelink UE located within the coverage of the base station can perform sidelink communication with a sidelink UE located outside the coverage of the base station (partial coverage scenario). Referring to FIG. 1B, the base station where UE-1 is located may operate as a time division duplexing (TDD) system. In this case, sidelink signals transmitted by UE-2 and other UEs (not shown in FIG. 1B) located outside the coverage of the base station may cause interference. Specifically, when UE-1 receives control information and data information from the base station through downlink, the sidelink control information and data information transmitted by UE-2 may cause interference to the downlink signal received by UE-1. Referring to FIG. 1B, when UE-1 is located at the edge of the coverage of the base station (i.e., far from the base station) and UE-2 is located adjacent to UE-1, the interference problem may become serious. Meanwhile, when UE-1 transmits control information and data information to the base station through uplink, the sidelink control information and data information transmitted by UE-2 may cause interference to the uplink signal of UE-1 received by the base station. However, since UE-2 is further away from the base station than UE-1, at the receiver of the base station the received signal from UE-2 may not cause much interference to the received signal from UE-1. In addition, because the base station can use more reception antennas compared to the receiver of UE-1, it is possible to use more advanced reception techniques such as interference cancellation. Therefore, when comparing the case where the signal of UE-2 causes interference to the receiver of UE-1 and the case where the signal of UE-2 causes interference to the receiver of the base station, the former case has a greater impact on system performance.

In order to solve the interference problem in the TDD system, a sidelink UE transmitting the S-SSB within the coverage of the base station may transmit TDD configuration information configured by the base station (i.e., downlink and uplink configuration information that all UEs located within the coverage of the base station must follow) to a sidelink UE located outside the coverage of the base station through the PSBCH. Upon receiving the information through the PSBCH, the sidelink UE located outside the coverage of the base station may configure a resource pool for transmission/reception of sidelink control information and data information using only an uplink subframe or uplink slot, excluding a downlink subframe, a special subframe, a downlink slot, and a flexible slot.

3. Slot index: Referring to FIG. 5, one system frame may consist of a plurality of subframes. In addition, one subframe may consist of a plurality of slots depending on the subcarrier spacing. Accordingly, an indicator indicating in which slot of the indicated frame number the S-SSB is transmitted may be required. The slot index may refer to information indicating an index of a slot through which the S-SSB is transmitted in a frame index indicated by the frame number. For example, subcarrier spacings of 15 kHz, 30 kHz, 60 kHz, and 120 kHz may consist of 10 slots, 20 slots, 40 slots, and 80 slots, respectively, within one frame consisting of 10 ms. Thus, 7 bits may be required to transmit 80 slot indexes.

4. Coverage indicator: In the case where a synchronization signal of a base station (e.g., eNB/gNB) is configured to have a higher priority than the GNSS, an S-SSB transmitted by a sidelink UE that is directly synchronized from the base station may have priority over an S-SSB transmitted by any other sidelink UE, that is, having a higher priority than an S-SSB transmitted by a sidelink UE synchronized directly or indirectly with the GNSS and an S-SSB transmitted by a sidelink UE synchronized directly or indirectly with an S-SSB transmitted by another sidelink UE. This may mean that timing of the base station is transmitted to a sidelink UE located outside the coverage of the base station through a sidelink UE located within the coverage of the base station. To determine the priority, a 1-bit indicator representing a coverage state may be included in the PSBCH. For example, when the 1-bit indicator is set to '1', it may mean that a sidelink UE transmitting the PSBCH is located within the coverage of the base station. Also, when the 1-bit indicator is set to '0', it may mean that the sidelink UE transmitting the PSBCH is located outside the coverage of the base station. Alternatively, vice versa is also possible. Therefore, a sidelink UE receiving the PSBCH can determine whether any received S-SSB is transmitted from a sidelink UE located within the coverage of the base station or from a sidelink UE located outside the coverage of the base station. Based on this, it is possible to determine which S-SSB to match sidelink synchronization with (i.e., selection of a sidelink synchronization signal source).

Meanwhile, in addition to the above-mentioned information, a reserved bit not used in the current Release may be included in the PSBCH. For example, a reserved bit consisting of 2-bit or 1-bit may be included, which may be used for a later Release UE (i.e., a sidelink UE of Release 16 does not interpret the reserved bit, and if the reserved bit is used for the introduction of a new sidelink function in Release 17 or more, a sidelink UE of Release 17 or more may interpret the corresponding bit).

In addition, the sidelink synchronization channel may be used in a licensed band, or an ITS band which is a frequency band for vehicle communication, or an unlicensed band, and sidelink synchronization channel information included in respective bands may be the same or at least partially different.

Referring to FIG. 6, among sidelink synchronization channels, the frequency size of PSBCH is 132 subcarriers (11 PRBs), and the frequency size of S-PSS and S-SSS is 127 subcarriers. This may be applied only to Rel-16 5G NR V2X, and it may be possible to be configured in a different value or form in subsequent Releases.

Figure 7:
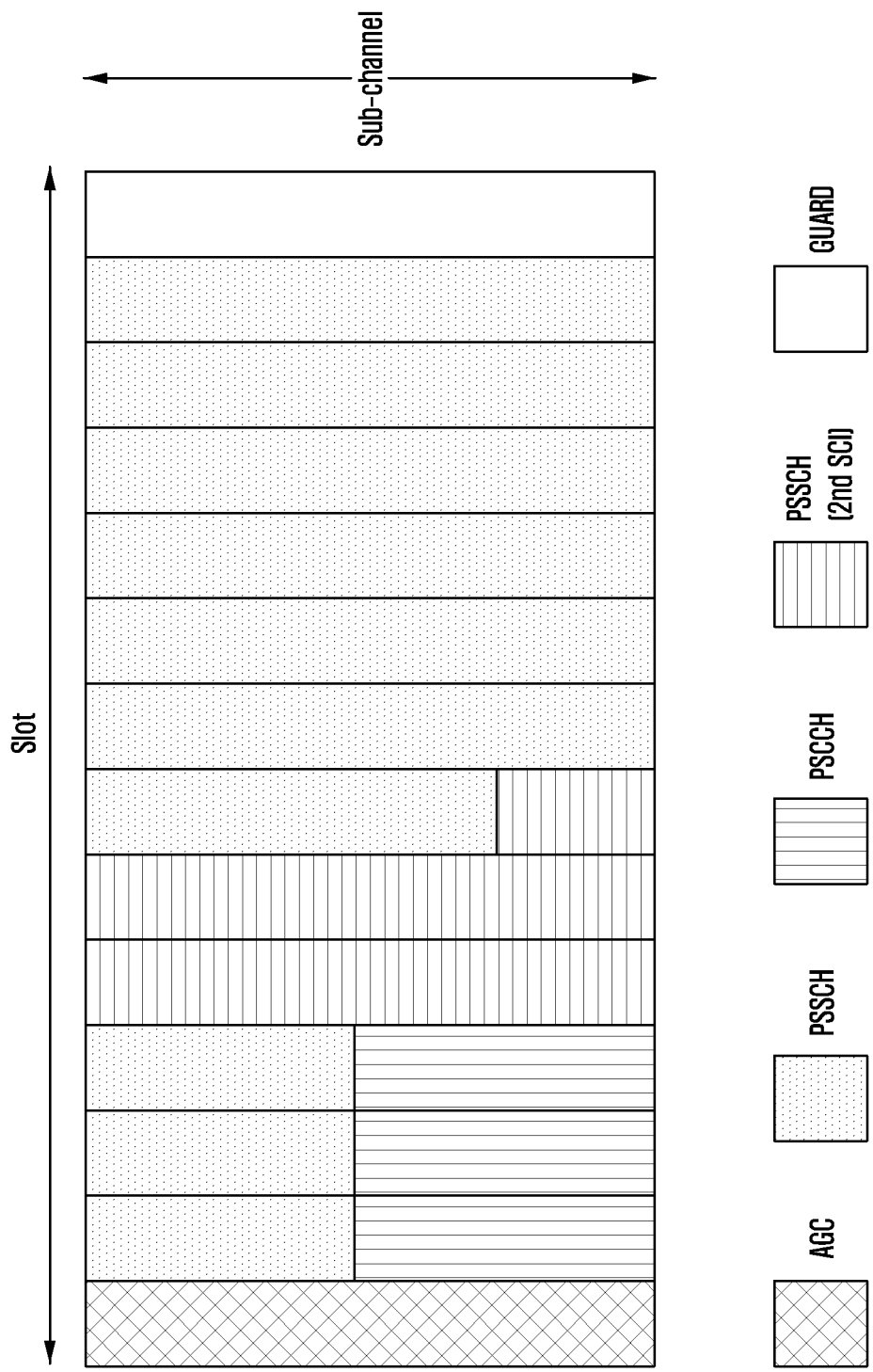
FIG. 7 illustrates a structure of a sidelink channel according to an embodiment of the disclosure.

FIG. 7 illustrates a structure of a sidelink channel according to an embodiment of the disclosure.

Referring to FIG. 7, for sidelink data transmission and reception, the sidelink channel may be basically composed of one Adaptive Gain Controller (AGC) symbol for antenna gain control, three Physical Sidelink Control Channel (PSCCH) symbols, twelve Physical Sidelink Shared Channel (PSSCH) symbols, and one GUARD symbol.

Referring to FIG. 7, the number of symbols for each physical channel is only an example, and it may be possible to set different numbers of symbols for each channel. The PSSCH may include not only data information but also second control information (2nd SCI) indicated by first control information (1st SCI, Sidelink Control Information) included in the PSCCH, or it may be composed of only the PSSCH without 2nd SCI information.

The first symbol is the AGC symbol and may consist of the same information as the second symbol. The reason why the AGC symbol is needed is as follows. One of the main characteristics of sidelink communication is that there may be a plurality of transmitting ends that wish to transmit and they may have different distances from a receiving end and have different transmit powers. Thus, from the standpoint of the receiving end, a difference in received power strength may occur depending on which transmitting end performs sidelink communication. Therefore, since the receiving end needs time to correct this difference, the first symbol is allocated as the AGC symbol for this as shown in FIG. 7.

The PSCCH is a physical channel that delivers sidelink control information (SCI), and may have at least one value among 10, 12, 15, 20, and 25 PRBs in one sub-channel, which can be configured by higher layer signaling. Although the number of symbols of the PSCCH is shown as three symbols in FIG. 7, one symbol or two symbols are also possible, and this value can be configured by higher layer signaling. Control information included in the PSCCH is mapped from the lowest PRB index.

The PSSCH is a physical channel that delivers sidelink data information (TB, Transport Block), and 2nd SCI information may be mapped from the first DMRS symbol transmitted on the PSSCH. The PSSCH may be transmitted in units of one sub-channel. The size of one sub-channel may have at least one value among 10, 12, 15, 20, 25, 50, 75, and 100 PRBs, and 1 to a maximum of 27 sub-channels may exist within one SL BWP. In addition, when the PSSCH and the PSCCH have the same PRB, the 2nd, 3rd and 4th symbols in FIG. 7 may become symbols all composed of PSCCH. Although not separately shown in FIG. 7, a reference signal Demodulation Reference Signal (DMRS) for decoding the PSSCH may be included in the 5th symbol. In addition, although not separately shown in FIG. 7, Physical Sidelink Feedback Channel (PSFCH) that delivers HARQ-ACK information for the PSSCH rather than the PSSCH may exist in 12th and 13th symbols. If there is the PSFCH, the 10th symbol may be the GUARD symbol. The purpose of introducing the GUARD symbol is that a UE receiving the PSSCH needs a separate conversion (switching) time to transmit the PSFCH, and one symbol is added for this purpose. Also, the reason why the 14th symbol is the GUARD symbol is similar to the above. Referring to FIG. 7 as an example, it is because when a UE transmitting PSCCH/PSSCH in slot n receives PSCCH/PSSCH from another UE in slot n+1, or a UE receiving PSCCH/PSSCH in slot n transmits PSCCH/PSSCH to another UE in slot n+1, time for switching between transmission and reception is required. The transport format transmitted by the UE in the PSFCH is the same as PUCCH format 0 defined in the 3GPP Rel-15 NR standard, and is composed of repeated transmission over one PRB and two symbols based on the Zadoff-Chu sequence. As described above, the first symbol of two symbols of the PFSCH may be used for AGC.

In the above description, the first control information may provide information related to resource allocation. For example, the first control information may include at least one of frequency resource information, time resource information, a DMRS pattern, a second control information format, a resource size to which the second control information is allocated, the number of DMRS ports, MCS, and whether PSFCH is transmitted or not. In the above example, the DMRS pattern is a field that informs information about the DMRS allocated to time and frequency resources for PSSCH reception, and the second control information format is a field that informs the size and configuration information of second control information transmitted on the PSSCH. Also, the resource size to which the second control information is allocated is a field indicating the amount of resources that the second control information is allocated to the PSSCH, and the number of DMRS ports is a field indicating information about the number of ports through which the DMRS is transmitted. The Modulation and Coding Scheme (MCS) is a field that indicates encoded information in the PSSCH.

The second control information may provide UE-specific information or detailed information related to a corresponding service. For example, the second control information may be composed of at least one field of a HARQ process number, a new data indicator (NDI), a redundancy version (RV), a source ID, a destination ID, a HARQ feedback enabled/disabled indicator, a cast type indicator, and a CSI request. In the above example, the NDI consists of 1 bit and is a field indicating whether the TB of the currently transmitted PSSCH is retransmission or initial transmission. In this field, if toggling (changed from 1 to 0 or from 0 to 1) occurs, it is determined as initial (or new) transmission, and if toggling does not occur, it is determined as retransmission. The RV is a field indicating a start point of an encoded bit when the PSSCH is encoded based on Low Density Parity Check (LDPC) coding. The source ID indicates the ID of a UE transmitting the PSSCH, and the destination ID indicates the ID of a UE receiving the PSSCH. The HARQ feedback enabled/disabled indicator is an indicator field indicating whether HARQ feedback for the corresponding PSSCH transmission is transmitted or not, and the cast type indicator is a field indicating whether the currently transmitted PSSCH is unicast, groupcast, or broadcast. The CSI request is a field including an instruction for the receiving UE to send measured CSI information to the transmitting UE. A time resource for sidelink communication may be set to one of 7 to 14 symbols within one slot consisting of 14 symbols for each SL Bandwidth Part (BWP).

Described in FIGS. 6 and 7 are the structures for transmitting/receiving the synchronization channels and the control/data channels for sidelink communication. It is possible to apply these structures to an unlicensed band, but there is a problem of compliance with specific conditions due to different regulations and restrictions in each country or continent. One of them is Occupied Channel Bandwidth (OCB), and its definition is that a frequency bandwidth containing 99% of transmission signal power should be included in 80% to 100% of the nominal channel bandwidth in which the signal transmission is performed. For example, in an unlicensed band having a channel frequency bandwidth of 20 MHz, it may be seen that a UE satisfies the above regulation only when it unconditionally performs transmission of at least 16 MHz or more. For reference, the value of 80% is just an example and may have different values for each country.

However, in the case of a UE, the use of a wide bandwidth will cause an effect of reducing the transmission distance by lowering the transmission power efficiency, which results in reducing the communication radius in the unlicensed band. Therefore, if at least one PRB per specific M PRBs is allocated in terms of frequency without necessarily being allocated contiguously in a bandwidth to which a signal including 80% to 100% of the channel frequency bandwidth is allocated, it may be possible to satisfy the above regulation. Accordingly, a method of allocating control or data information at regular intervals in terms of frequency, rather than a method of continuously allocating such information, is referred to as an interlace method of resource allocation. For example, an interlace block 'm' may have a value of 0 to M−1. The value of 'm' may be considered that a resource is actually allocated to a common resource block {m, M+m, 2M+m, 3M+m, . . . }, and the value of 'M' may have a different value depending on the subcarrier spacing. The interlace method does not have to be satisfied in all countries and continents that use the unlicensed band, and may be used only in countries and continents that must satisfy some relevant regulations, and such configuration may be made by higher layer signaling. However, in the case of sidelink communication, since it is necessary to support communication in a region outside the coverage without separate configuration of the base station, it may be possible to support sidelink communication by considering GPS information, previously determined location information, or the interlace structure from the time of manufacturing the UE in the region requiring the relevant regulation.

Using the sidelink channel structures described in FIGS. 6 and 7, it is checked whether the OCB regulation is satisfied. First, in the case of a synchronization channel composed of 11 PRBs in FIG. 6, it may be difficult to transmit the synchronization channel in a system having a channel frequency bandwidth composed of 100 PRBs. Also, in the case of a PSCCH/PSSCH composed of 20 PRBs as an example in FIG. 7, it may be difficult to transmit a control/data channel in a system having a channel frequency bandwidth composed of 100 PRBs. Since the 100 PRBs are the number of possible PRBs in a 20 MHz band with a 15 kHz subcarrier spacing, it is difficult to freely utilize the structures of FIGS. 6 and 7 in such an environment. Of course, since it is possible to configure PSCCH/PSSCH composed of 100 PRBs in FIG. 7, the transmission of control/data channels is possible while limitedly satisfying the OCB requirements. However, since frequency division multiplexing (FDM) with other UEs is not allowed, only one UE can transmit/receive data at a specific moment.

Figure 8:
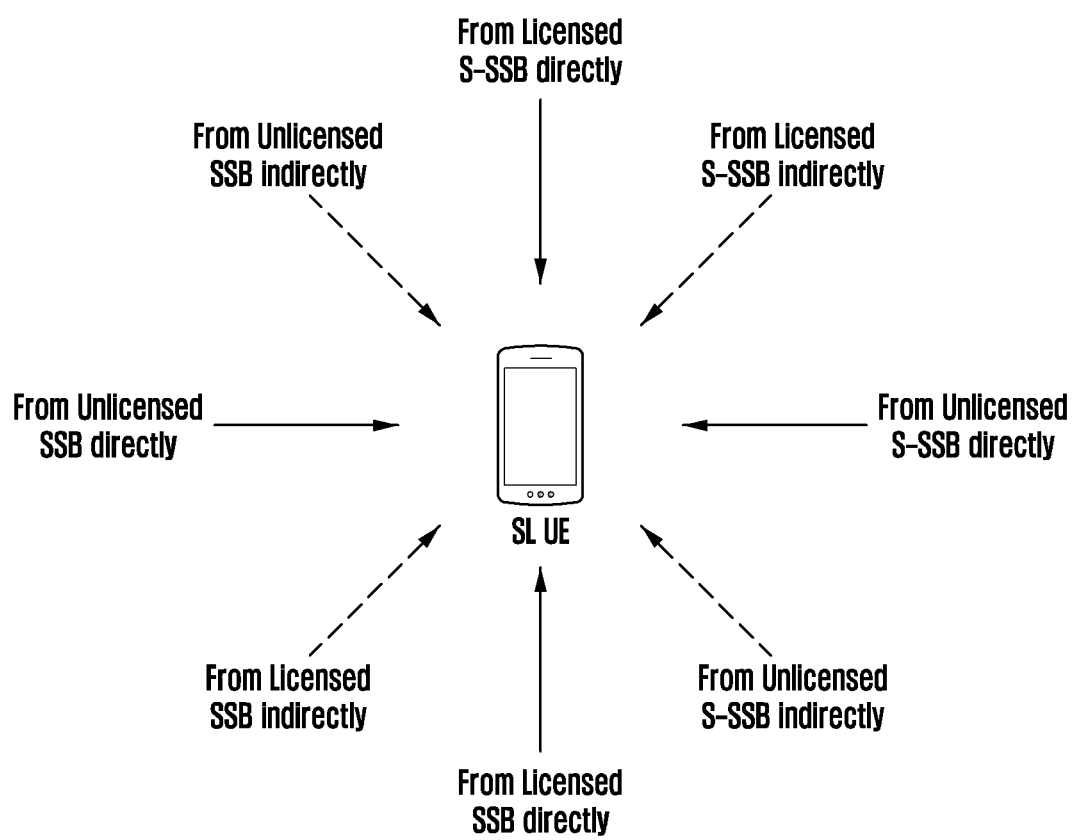
FIG. 8 illustrates types of synchronization signals that can be transmitted and received by a sidelink UE in an unlicensed band according to an embodiment of the disclosure.

FIG. 8 illustrates types of synchronization signals that can be transmitted and received by a sidelink UE in an unlicensed band according to an embodiment of the disclosure.

A sidelink UE operating in the unlicensed band may transmit/receive the above-described synchronization signals shown in FIG. 4 in addition to the synchronization signals shown in FIG. 8. For convenience of description, a UE receiving a synchronization signal in the unlicensed band is referred to as a sidelink UE-A.

A licensed band SSB may refer to a synchronization signal transmitted by a base station operating in a licensed band. Directly receiving the licensed band SSB may mean that the sidelink UE directly receives the SSB from the base station operating in the licensed band. Indirectly receiving the licensed band SSB may mean a case where the sidelink UE-A receives a sidelink synchronization signal transmitted by a sidelink UE (e.g., UE-1) that is directly synchronized with the licensed band SSB. In this case, the sidelink UE-A may receive a synchronization signal from the base station operating in the licensed band through two hops. In another example, a second sidelink UE (e.g., UE-2) synchronized with the S-SSB transmitted by a first sidelink UE (e.g., UE-1) synchronized with the base station operating in the licensed band may transmit the S-SSB. Upon receiving this, the sidelink UE-A may receive a synchronization signal from the base station operating in the licensed band through three hops. Similarly, the sidelink UE-A may receive a synchronization signal from the base station operating in the licensed band through more than three hops. In this case, the sidelink synchronization signal source may be another sidelink UE (e.g., UE-1) synchronized with the base station operating in the licensed band.

An unlicensed band SSB may refer to a synchronization signal transmitted by a base station operating in the unlicensed band. Directly receiving the unlicensed band SSB may mean that the sidelink UE directly receives the SSB from the base station operating in the unlicensed band. Indirectly receiving the unlicensed band SSB may mean a case where the sidelink UE-A receives a sidelink synchronization signal transmitted by a first sidelink UE (e.g., UE-1) that is directly synchronized with the unlicensed band SSB. In this case, the sidelink UE-A may receive a synchronization signal from the base station operating in the unlicensed band through two hops. In another example, a second sidelink UE (e.g., UE-2) synchronized with the S-SSB transmitted by the first sidelink UE (e.g., UE-1) synchronized with the base station operating in the unlicensed band may transmit the S-SSB. Upon receiving this, the sidelink UE-A may receive a synchronization signal from the base station operating in the unlicensed band through three hops. Similarly, the sidelink UE-A may receive a synchronization signal from the base station operating in the unlicensed band through more than three hops. In this case, the sidelink synchronization signal source may be another sidelink UE (e.g., UE-1) synchronized with the base station operating in the unlicensed band.

Alternatively, the licensed band S-SSB may refer to a synchronization signal transmitted by a sidelink UE operating in the licensed band or a band for vehicle communication (Intellectual Transport Service (ITS) band). A sidelink UE-A may directly receive a synchronization signal from a sidelink UE-B operating in another licensed band. When the sidelink UE-B fails to detect a synchronization signal transmitted from the GNSS, the unlicensed band base station, the licensed band base station, or another sidelink UE which is the synchronization signal source, the sidelink UE-B may transmit the S-SSB based on its own timing. The sidelink UE-A may directly receive the S-SSB transmitted by the sidelink UE-B operating in the licensed band. In this case, the sidelink synchronization signal source may be a sidelink UE.

The sidelink UE-A may indirectly receive a synchronization signal from another sidelink UE-B. Indirectly receiving a synchronization signal from the sidelink UE-B operating in the licensed band may mean a case where the sidelink UE-A receives the S-SSB transmitted by the sidelink UE-1 that is directly synchronized with the sidelink UE-B. In this case, the sidelink UE-A may receive a synchronization signal from the sidelink UE-B operating in the licensed band through two hops. In another example, a sidelink UE-2 synchronized with the S-SSB transmitted by the sidelink UE-1 directly synchronized with the sidelink UE-B may transmit the S-SSB. Upon receiving this, the sidelink UE-A may receive a synchronization signal from the sidelink UE-B through three hops. Similarly, the sidelink UE-A may receive a synchronization signal from the sidelink UE-B operating in the licensed band through more than three hops. In this case, the sidelink synchronization signal source may be a sidelink UE operating in another licensed band synchronized with a sidelink UE.

The unlicensed band S-SSB may refer to a synchronization signal transmitted by a sidelink UE operating in the unlicensed band. A sidelink UE-A may directly receive a synchronization signal from a sidelink UE-B operating in another unlicensed band. When the sidelink UE-B fails to detect a synchronization signal transmitted from the GNSS, the unlicensed band base station, the licensed band base station, or another sidelink UE which is the synchronization signal source, the sidelink UE-B may transmit the S-SSB based on its own timing. The sidelink UE-A may directly receive the S-SSB transmitted by the sidelink UE-B operating in the unlicensed band. In this case, the sidelink synchronization signal source may be a sidelink UE.

The sidelink UE-A may indirectly receive a synchronization signal from another sidelink UE-B. Indirectly receiving a synchronization signal from the sidelink UE-B operating in the unlicensed band may mean a case where the sidelink UE-A receives the S-SSB transmitted by a sidelink UE-1 directly synchronized with the sidelink UE-B. In this case, the sidelink UE-A may receive a synchronization signal from the sidelink UE-B operating in the unlicensed band through two hops. In another example, the sidelink UE-2 synchronized with the S-SSB transmitted by the sidelink UE-1 directly synchronized with the sidelink UE-B may transmit the S-SSB. Upon receiving this, the sidelink UE-A may receive a synchronization signal from the sidelink UE-B through three hops. Similarly, the sidelink UE-A may receive a synchronization signal from the sidelink UE-B operating in the licensed band through more than three hops. In this case, the sidelink synchronization signal source may be a sidelink UE operating in another licensed band synchronized with a sidelink UE.

When the sidelink UE-B fails to detect a synchronization signal transmitted from the GNSS, the unlicensed band base station, the licensed band base station, or another sidelink UE which is the synchronization signal source, the sidelink UE-B may consider a separate timer for transmitting a synchronization signal based on its own timing. For example, when the sidelink UE-B fails to detect, for a certain period of time, a synchronization signal transmitted from the GNSS, the unlicensed band base station, the licensed band base station, another sidelink UE operating in the licensed band, or another sidelink UE operating in the unlicensed band which is the synchronization signal source, the sidelink UE-B may transmit a synchronization signal based on its own timing.

The meaning of the timer may refer to a reference time point for transmitting a synchronization signal based on its own timing in the case of failing to receive the synchronization signal from any other synchronization signal source during the corresponding timer time. If a synchronization signal is received from any other synchronization signal source within the timer time, the sidelink UE-B may transmit the synchronization signal by matching the corresponding synchronization signal source. The timer may be, for example, in a time unit such as 200 ms or a slot unit such as 200 slots. Also, it may be possible to have different timer values depending on synchronization signal sources. For example, a timer value for a synchronization signal transmitted by the licensed band base station or another sidelink UE operating in the licensed band may be 160 ms, and a timer value for a synchronization signal transmitted by the unlicensed band base station or another sidelink UE operating in the unlicensed band may be 320 ms.

The sidelink UE operating in the unlicensed band may receive synchronization signals from the various synchronization signal sources as described above and may perform synchronization based on a synchronization signal transmitted from a synchronization signal source having a higher priority according to preconfigured priorities. For example, the following priorities may be configured in advance in order from a synchronization signal having a high priority to a synchronization signal having a low priority.

Synchronization prioritization method 1: 1) A synchronization signal transmitted directly from the GNSS>2) A synchronization signal transmitted by a UE performing synchronization directly from the GNSS>3) A synchronization signal transmitted by a UE performing synchronization indirectly from the GNSS>4) A synchronization signal transmitted directly from a base station operating in the unlicensed band >5) A synchronization signal transmitted by a UE performing synchronization directly from the base station operating in the unlicensed band >6) A synchronization signal transmitted by a UE performing synchronization indirectly from the base station operating in the unlicensed band >7) A synchronization signal transmitted by a UE not performing synchronization directly or indirectly from the GNSS or the base station operating in the unlicensed band Synchronization prioritization method 2: 1) A synchronization signal transmitted directly from the GNSS>2) A synchronization signal transmitted by a UE performing synchronization directly from the GNSS>3) A synchronization signal transmitted by a UE performing synchronization indirectly from the GNSS>4) A synchronization signal transmitted directly from a base station operating in the licensed band >5) A synchronization signal transmitted by a UE performing synchronization directly from the base station operating in the licensed band >6) A synchronization signal transmitted by a UE performing synchronization indirectly from the base station operating in the licensed band >7) A synchronization signal transmitted directly from a base station operating in the unlicensed band >8) A synchronization signal transmitted by a UE performing synchronization directly from the base station operating in the unlicensed band >9) A synchronization signal transmitted by a UE performing synchronization indirectly from the base station operating in the unlicensed band >10) A synchronization signal transmitted by a licensed band UE not performing synchronization directly or indirectly from the GNSS or the base station operating in the licensed band or the unlicensed band >11) A synchronization signal transmitted by an unlicensed band UE not performing synchronization directly or indirectly from the GNSS or the base station operating in the licensed band or the unlicensed band Synchronization prioritization method 3: 1) A synchronization signal transmitted directly from the GNSS>2) A synchronization signal transmitted by a UE performing synchronization directly from the GNSS>3) A synchronization signal transmitted by a UE performing synchronization indirectly from the GNSS>4) A synchronization signal transmitted by an unlicensed band UE not performing synchronization directly or indirectly from the GNSS The synchronization prioritization method 1 is a method applicable when the sidelink UE does not support the licensed band operation. The synchronization prioritization method 2 is a method applicable when the sidelink UE supports both the licensed band and unlicensed band operations. Specifically, it is a method that can be considered when the UE can apply a synchronization value matched in the licensed band to the timing in the unlicensed band. The synchronization prioritization method 3 is a method applicable when the UE does not support the licensed band and unlicensed band Uu operations. This is just an example, and it may be possible to apply at least one of the above-described synchronization prioritization methods regardless of UE capabilities. In addition, the prioritization methods may be determined according to UE capabilities or determined according to preconfigured information or higher layer signaling configuration information by the base station. If the UE does not have the GNSS capability, it may be possible to omit the priorities of GNSS-related synchronization signals in the above-described synchronization prioritization methods. The synchronization prioritization methods 1, 2, and 3 are examples, and it may be possible to apply a changed order, or it may be possible to omit some operations.

Figure 9:
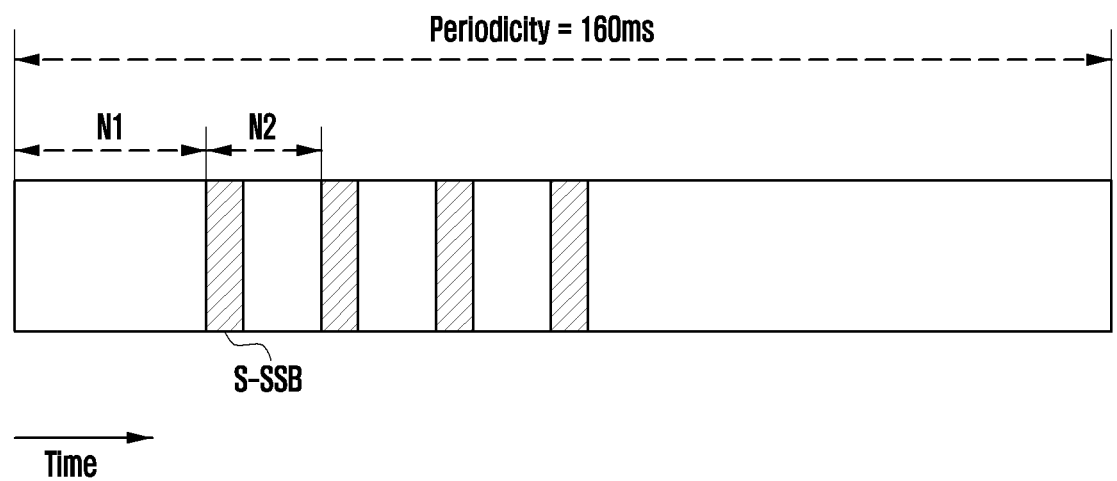
FIG. 9 illustrates an example of a synchronization signal transmission periodicity according to an embodiment of the disclosure.

FIG. 9 illustrates a synchronization signal transmission periodicity according to an embodiment of the disclosure.

Referring to FIG. 9, the sidelink UE operating in the licensed band may be able to transmit one to four S-SSBs depending on a subcarrier spacing at a periodicity of 160 ms. Referring to FIG. 9, N1 denotes an offset value from the start time point of periodicity (e.g., 160 ms) to a resource through which the first S-SSB is transmitted, and N2 denotes a gap between S-SSB transmission resources. For example, the sidelink UE operating in the licensed band transmits one S-SSB per periodicity of 160 ms in a subcarrier spacing of 15 kHz, transmits one or two S-SSBs per periodicity of 160 ms in a subcarrier spacing of 30 kHz, and transmits one, two, or four S-SSBs per periodicity of 160 ms in a subcarrier spacing of 60 kHz. When a plurality of S-SSBs can be transmitted, the sidelink UE can perform transmission with a preconfigured value or a value configured by higher layer signaling from the base station. The sidelink UE operating in the licensed band can transmit the S-SSB through configured resources without permission for a separate channel access.

However, the sidelink UE operating in the unlicensed band can transmit the S-SSB in configured resources depending on whether channel access is successful, and if channel access fails, it must wait until the S-SSB resource that arrives in the next cycle. Therefore, compared to the licensed band, the sidelink UE operating in the unlicensed band has a possibility that the delay time for transmitting the S-SSB is increased, which may affect synchronization between UEs operating in the unlicensed band. In addition, since there is a possibility of channel access failure in the unlicensed band compared to the licensed band, it may be necessary to configure more S-SSB transmission candidate resources. To this end, the sidelink UE operating in the unlicensed band may be able to apply at least one of the following methods.

Method 1-1: The sidelink UE operating in the unlicensed band can support transmission(s) of more S-SSB candidates in the same subcarrier spacing compared to the sidelink UE operating in the licensed band. For example, the sidelink UE operating in the licensed band with a subcarrier spacing of 15 kHz transmits one S-SSB every periodicity of 160 ms, but the sidelink UE operating in the unlicensed band may transmit one or two S-SSBs. In another example, the sidelink UE operating in the licensed band with a subcarrier spacing of 30 kHz transmits one or two S-SSBs every periodicity of 160 ms, but the sidelink UE operating in the unlicensed band may transmit one, two or four S-SSBs. The above examples are only exemplary, and the maximum number of S-SSBs that can be transmitted in the unlicensed band in the same periodicity and the same subcarrier spacing may be greater than the maximum number of S-SSBs that can be transmitted in the licensed band.

Method 1-2: The sidelink UE operating in the unlicensed band can support the S-SSB transmission with a shorter transmission periodicity in the same subcarrier spacing compared to the sidelink UE operating in the licensed band. For example, the sidelink UE operating in the licensed band with a subcarrier spacing of 15 kHz transmits one S-SSB every periodicity of 160 ms, but the sidelink UE operating in the unlicensed band may transmit one S-SSB in a periodicity smaller than 160 ms, for example, every 80 ms. Therefore, based on 160 ms, the UE operating in the unlicensed band can transmit a total of two S-SSBs.

Method 1-3: This method is a combination of Method 1-1 and Method 1-2. The sidelink UE operating in the unlicensed band can transmit more S-SSB candidates with a shorter transmission periodicity than the sidelink UE operating in the licensed band.

Method 1-4: If the sidelink UE operating in the unlicensed band has m transmittable candidates within one S-SSB transmission periodicity, it may be possible to limit actual S-SSB transmissions to a maximum of n (n<m) per transmission periodicity. For example, in the case where up to two S-SSB resources are configured for every 160 ms periodicity based on a 15 kHz subcarrier spacing and only up to one S-SSB can be transmitted (m=2, n=1), if the sidelink UE succeeds in channel access in the first S-SSB resource and transmits the S-SSB, it may skip channel access and S-SSB transmission in the second S-SSB resource. On the other hand, upon failing to transmit the S-SSB due to channel access failure in the first S-SSB resource, the sidelink UE may attempt channel access in the second S-SSB resource and transmit the S-SSB depending on whether the channel access is successful or not. In another example, in the case where up to four S-SSB resources are configured for every 160 ms periodicity based on a 30 kHz subcarrier spacing and only up to two S-SSBs can be transmitted (m=4, n=2), if the sidelink UE succeeds in channel access in the first and second S-SSB resources and transmits the S-SSB, it may skip channel access and S-SSB transmission in the third and fourth S-SSB resources. On the other hand, upon failing to transmit the S-SSB due to channel access failure in the first S-SSB resource, the sidelink UE may attempt channel access at least in the second and third S-SSB resources and transmit the S-SSB depending on whether the channel access is successful or not. In summary, if the UE succeeds in channel access for at least two S-SSB resources and transmits the S-SSB, it may skip channel access and S-SSB transmission for the remaining S-SSB resources within the periodicity. In this way, more S-SSB transmission candidate resources can be allocated to UEs operating in the unlicensed band, and the number of UEs actually transmitting the S-SSB using S-SSB resources can increase. This method may be applied as at least one of the above-described Methods 1-1, 1-2, and 1-3.

Meanwhile, S-SSB resources configured for transmission by the sidelink UE operating in the licensed band are not considered as a resource region for sidelink control/data information transmission/reception. In other words, if there is a resource for the sidelink UE to transmit the S-SSB in slot n, the slot n is excluded from resource selection for sidelink control/data information transmission/reception. If UE-2 transmits sidelink control information or data information with a different frequency resource in a time resource region where UE-1 transmits the S-SSB, the UE-1 and the UE-2 cannot synchronize with each other because the UE-2 fails to receive the S-SSB transmitted by the UE-1. The reason for doing this is to make all UEs listen to the synchronization signal in an environment such as vehicle communication. Basically, since the sidelink UE operates in a half-duplex type, it can only receive or transmit at a specific point in time.

Even in the case of the sidelink UE operating in the unlicensed band, as in the licensed band, it may be possible to exclude resources configured for S-SSB (i.e., time resources) from resource selection for sidelink control/data information transmission and reception. However, as described above, the sidelink UE operating in the unlicensed band may fail in channel access, so there is a need to configure more S-SSB candidate resources compared to the licensed band. The fact that many S-SSB candidate resources are configured may mean that available resources capable of actually transmitting and receiving sidelink control/data information are reduced. For example, when the S-SSB is transmitted using time resources of 1 ms in a periodicity of 160 ms, the remaining resources of 159 ms may be used for sidelink control and data information. However, if the S-SSB can be transmitted using time resources of 10 ms in a 160 ms periodicity, only the remaining resources of 150 ms may be used for sidelink control and data information. Therefore, in the unlicensed band compared to the licensed band, there is a need of not only providing more S-SSB candidate resources but also minimize the reduction in available resources for sidelink control and data information. To solve this issue, the UE operating in the unlicensed band may be able to consider at least one or some combination of the following methods.

Method 2-1: PSCCH/PSSCH and S-SSB may be frequency division multiplexed (FDMed). In the unlicensed band, the PSCCH/PSSCH for unlicensed band sidelink communication may be transmitted and received in a frequency region other than the frequency region where the S-SSB is configured within a time resource (e.g., slot) where the S-SSB is transmitted.

Figure 10:
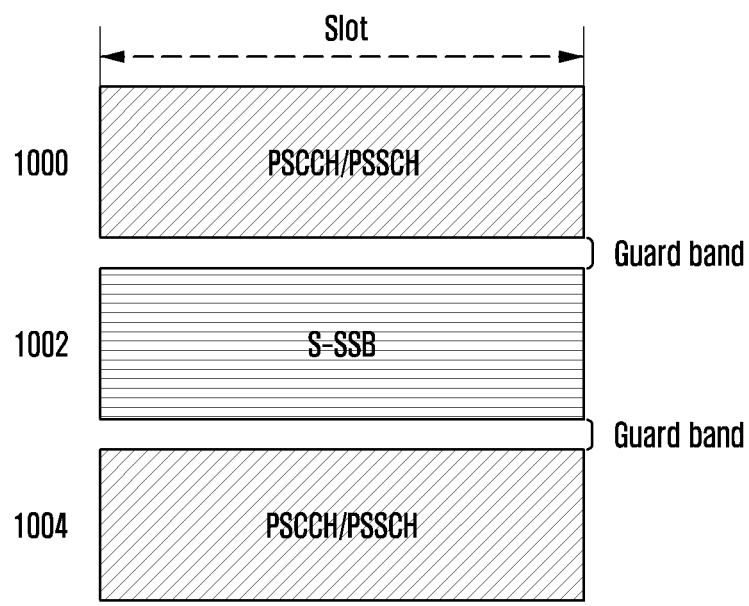
FIG. 10 illustrates an example of in which S-SSB and Physical Sidelink Control Channel (PSCCH)/Physical Sidelink Shared Channel (PSSCH) are transmitted/received in frequency division multiplexing (FDM) form according to an embodiment of the disclosure.
Figure 10:
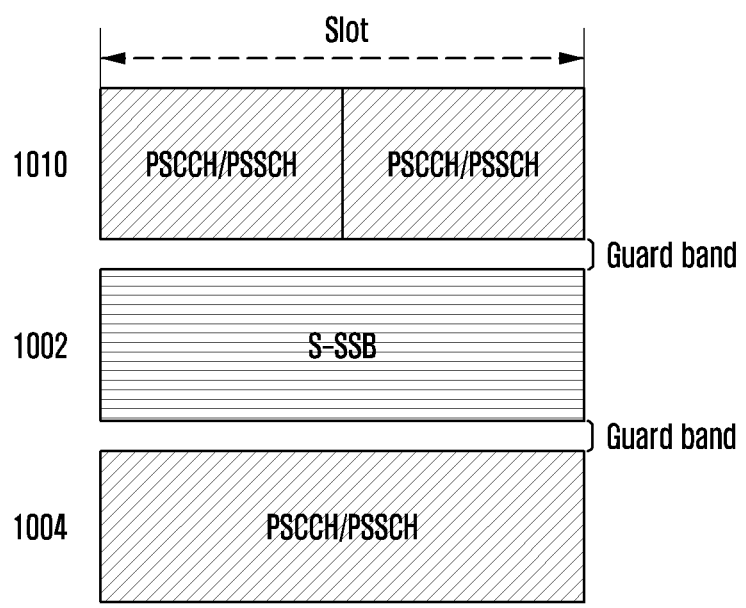

FIG. 10 illustrates a situation in which S-SSB and PSCCH/PSSCH are transmitted/received in FDM form according to an embodiment of the disclosure.

Referring to FIG. 10, a sidelink UE transmitting S-SSB 1002, a UE transmitting PSCCH/PSSCH 1000, and a UE transmitting PSCCH/PSSCH 1004 may be all identical, partially identical, or completely different from each other. FIG. 10 is just an example, and other cases where the number of PSCCHs/PSSCHs is one or more than two may be possible.

The frequency resource for S-SSB transmission may exist to be spaced apart from the frequency resource for PSCCH/PSSCH transmission by a guard band. The reason why the guard band exists is to guarantee the reception performance of the UE receiving the S-SSB. Specifically, since frequency filtering of the UE transmitting the PSCCH/PSSCH in a frequency band adjacent to the S-SSB may be incomplete, some of the power of the transmitted PSCCH/PSSCH may come over to the S-SSB frequency band. Therefore, there is a possibility that the receiving end for receiving the S-SSB receives a part of the PSCCH/PSSCH transmission signal transmitted in the adjacent band together with the transmission signal of the S-SSB. In another example, since the UE receiving the S-SSB is highly likely to be in a situation in which time and frequency synchronization are not precisely matched, it may attempt to receive the S-SSB in a frequency band wider than the frequency resource to which the S-SSB is allocated. Therefore, when the PSCCH/PSSCH exists in a frequency band adjacent to the S-SSB, the sidelink receiving UE may receive both the S-SSB and the PSCCH/PSSCH, and thus the S-SSB reception performance may be degraded. Therefore, the size of the guard band may be configured via higher layer signaling by the base station or may be fixed to a preconfigured value without higher layer signaling configuration.

In addition, although it is assumed in FIG. 10 that only the PSCCH and the PSSCH are transmitted, it may be possible that the PSFCH is further transmitted.

Referring to FIG. 10, as indicated by 1000, 1002, and 1004, the S-SSB and the PSCCH/PSSCH may be transmitted and received in the same slot, and as indicated by 1010, a plurality of PSCCHs/PSSCHs may be transmitted and received in one S-SSB slot. Conversely, a plurality of S-SSBs may be transmitted and received in one PSCCH/PSSCH slot. Also, the subcarrier spacing applied to PSCCH/PSSCH transmission and the subcarrier spacing applied to the S-SSB transmission may be equal to or different from each other.

Although Method 2-1 has described that the S-SSB is transmitted in the form of being FDMed with the PSCCH/PSSCH, it will be common for the S-SSB to be transmitted in the form of being FDMed and time division multiplexed (TDMed) with the PSCCH/PSSCH.

Figure 11:
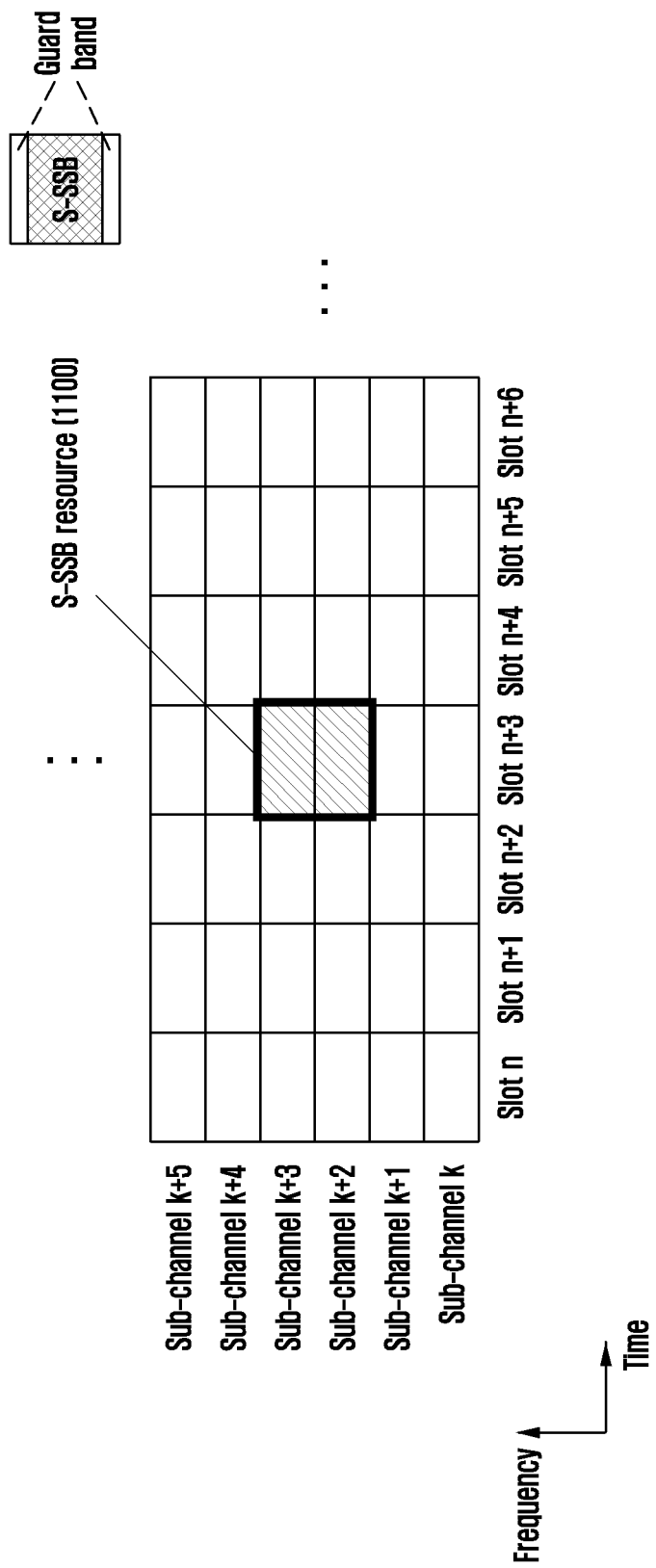
FIG. 11 illustrates allocation of an S-SSB transmission resource according to an embodiment of the disclosure.

FIG. 11 illustrates allocation of an S-SSB transmission resource according to an embodiment of the disclosure.

UEs basically have the same resource pool for sidelink communication, and it is common to transmit PSCCH/PSSCH by selecting one of resources divided into slot units in the time domain and sub-channel units in the frequency domain. In this case, sidelink UEs can understand that a resource region in which the S-SSB is transmitted and received is occupied by a specific slot and a specific sub-channel from the viewpoint of a resource pool. Therefore, a UE may perform sidelink communication by selecting a resource from the remaining resource pool except for the resource region in which the S-SSB is transmitted/received.

FIG. 11 shows a case where the resource region in which the S-SSB is transmitted is slot n+3 and sub-channels k+2 and k+3. This resource region cannot be used for PSCCH/PSSCH transmission and can be used by sidelink UEs intending to transmit the S-SSB. FIG. 11 is only an example of the resource region to which the S-SSB is allocated. From the point of view of time resources, the S-SSB may exist continuously or discontinuously in a plurality of slots, and from the point of view of frequency resources, the S-SSB may exist only in one sub-channel or may exist continuously or discontinuously in two or more sub-channels. Specifically, the number of sub-channels occupied by the S-SSB may vary according to the number of physical resource blocks (PRBs) included in the sub-channel. Also, regardless of whether or not resources are occupied by the S-SSB, a specific slot index and a specific number of sub-channels may be used for reserved resources not allocated for sidelink communication, and the S-SSB transmission may be further possible within such reserved resources.

Referring to FIG. 11, a guard band may exist separately in the S-SSB resource 1100, and it may be configured by higher layer signaling from the base station or preconfigured without separate signaling.

In addition, since a UE transmitting the PSCCH/PSSCH in a slot transmitting the S-SSB cannot receive the S-SSB transmitted by another UE as described above, a UE having a high priority for obtaining synchronization through S-SSB reception may lower the priority of selecting the corresponding slot. In other words, when a UE performing sidelink communication selects a PSCCH/PSSCH transmission resource in a slot (slot n+3 in FIG. 11) used for S-SSB transmission and a slot (slots other than slot n+3 in FIG. 11) not used for S-SSB transmission, it may be possible to select a resource for sidelink communication by considering both slots differently. For example, resource selection may be possible by first searching for slots (slots other than slot n+3 in FIG. 11) in which the S-SSB is not transmitted, and then if there is no available resource, further searching for slots (slot n+3 in FIG. 11) in which the S-SSB can be transmitted. This can be applied to the case where the sidelink UE operates in a mode of autonomously selecting a resource. In addition, a slot in which the S-SSB is transmitted may not allow PSFCH transmission. Referring to FIG. 11 as an example, when the S-SSB is transmittable in slot n+3, PSFCH transmission may be permitted only in slots other than slot n+3. The resource region in which the S-SSB is transmitted or reserved resources therefor may be configured via higher layer signaling from the base station or using preconfigured information.

Method 2-2: PSCCH/PSSCH and S-SSB may be FDMed and TDMed. Specifically, it may mean that the S-SSB is transmitted in a specific symbol within a slot in which the PSCCH/PSSCH is transmitted and received.

Figure 12:
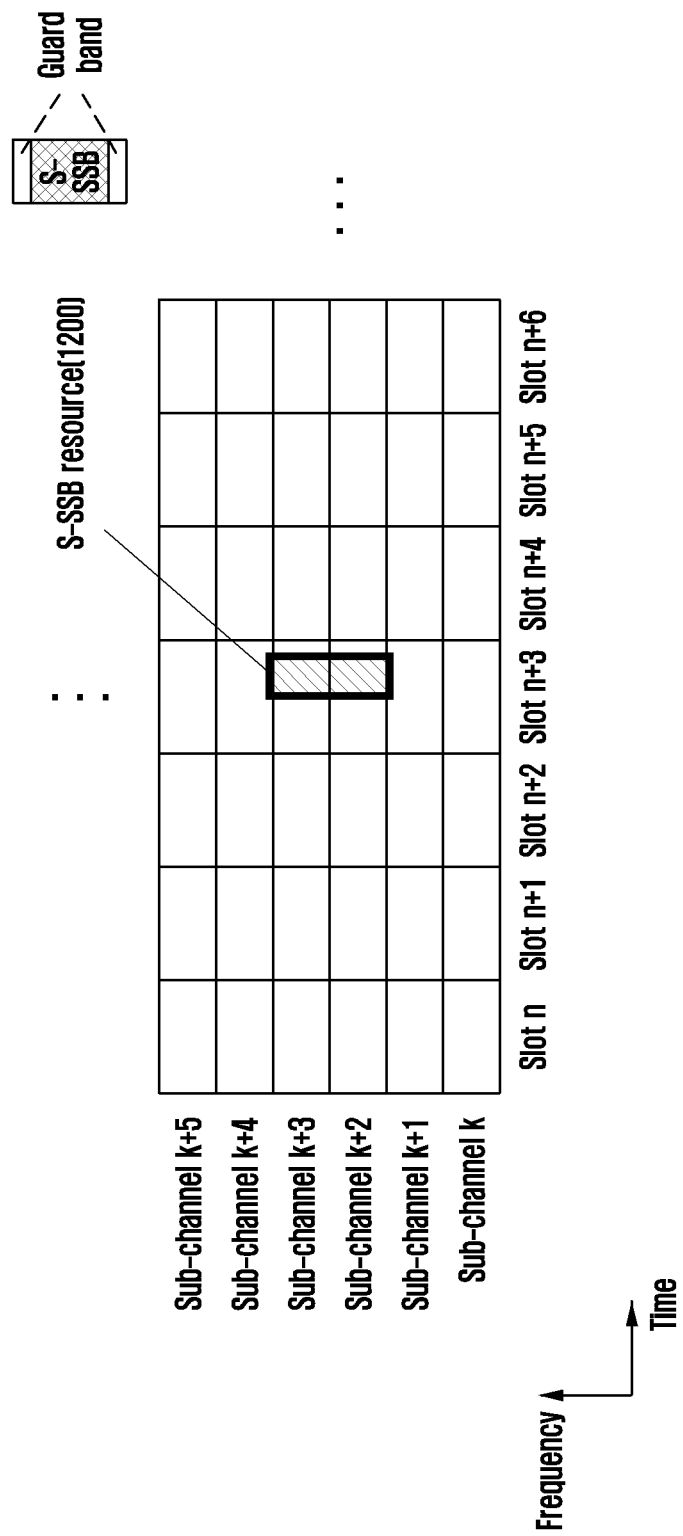
FIG. 12 illustrates a resource for S-SSB transmission according to an embodiment of the disclosure.

FIG. 12 illustrates a resource for S-SSB transmission according to an embodiment of the disclosure.

Referring to FIG. 12 as an example, shown is a situation in which a resource capable of transmitting the S-SSB is slot n+3 and sub-channels k+2 and k+3. In slot n+3, the S-SSB may be transmitted in a number of symbols less than 14 symbols. In addition, instead of the S-SSB structure described above with reference to FIG. 6, it may be possible to transmit the S-SSB 1002 including only the S-PSS and the S-SSS. Alternatively, even though composed of S-PSS, S-SSS, and PSBCH, the S-SSB may be configured in a form in which the PSBCH occupies smaller number of symbols by having a smaller payload than sidelink operating in the licensed band. Although the S-SSB consisting of 14 symbols is considered in FIG. 6, the S-SSB considered in FIG. 12 may consist of smaller symbols. If only the S-PSS and the S-SSS are included, transmission of the S-SSB consisting of 4 symbols may be possible. Referring to FIG. 12, the S-SSB transmission resource 1200 is not used for transmission/reception of PSCCH/PSSCH, and the sidelink UE can perform sidelink communication by selecting the remaining resource region excluding the corresponding resource.

A guard band may exist in the S-SSB transmission resource 1200, and as described above in Method 2-1, the number of sub-channels occupied by the S-SSB may vary according to the number of PRBs included in the sub-channel. In addition, reserved resources may be considered instead of the S-SSB resource region, and the sidelink UE desiring to transmit the PSCCH/PSSCH may select resources for PSCCH/PSSCH transmission from the rest except for the reserved resources. Also, a major difference from Method 2-1 is that PSCCH/PSSCH transmission is possible within a corresponding resource region even in a slot in which S-SSB is transmitted. Unlike FIG. 12, the resource location of the S-SSB may be in the first part or the last part of the slot. The resource region in which the S-SSB is transmitted or the reserved resource therefor may be configured via higher layer signaling from the base station or using preconfigured information.

Method 2-3: Method 2-3 is similar to Method 2-2, but it is a method in which sidelink data information or control information FDMed on a frequency basis exists in the time resource region in which the S-SSB is transmitted without a separate guard band.

Figure 13:
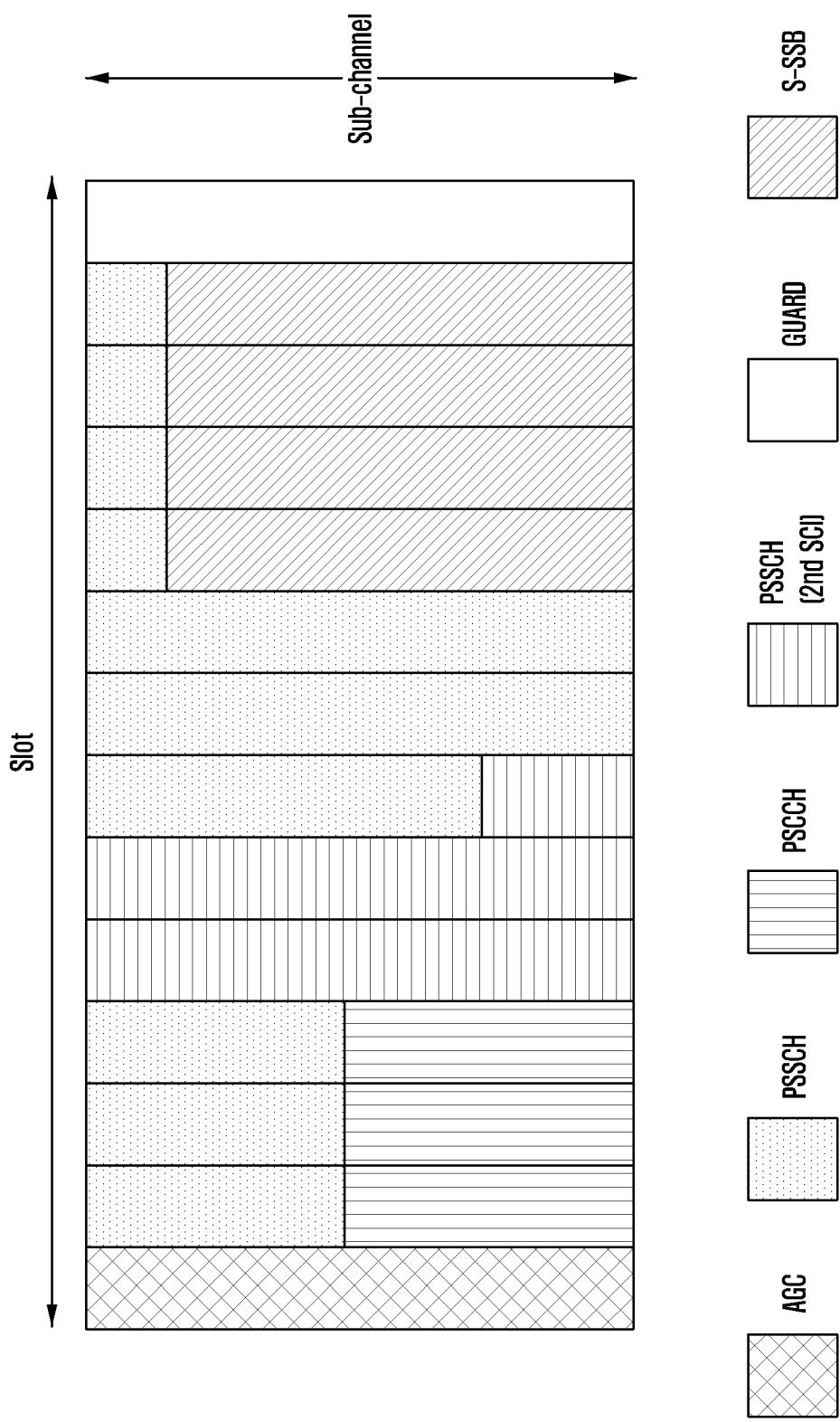
FIG. 13 illustrates a resource for S-SSB transmission according to an embodiment of the disclosure.

FIG. 13 illustrates a resource for S-SSB transmission according to an embodiment of the disclosure.

Referring to FIG. 13, it may be possible to transmit the S-SSB allocated in four symbols, and in this case, the PSSCH may be rate-matched in consideration of the resource to which the S-SSB is allocated. In this case, compared to the S-SSB described above in FIG. 6, the S-SSB may have a form including only the P-SSS and S-SSS or may have a form in which the PSBCH having a smaller payload size is added. In FIG. 13, the UE transmitting the PSCCH/PSSCH and the UE transmitting the PSBCH may be identical with or different from each other. If the UE transmitting the PSCCH/PSSCH and the UE transmitting the PSBCH are the same, it may be possible to allocate the PSSCH FDMed in the symbol in which the S-SSB is transmitted in FIG. 13. If the UE transmitting the PSCCH/PSSCH and the UE transmitting the PSBCH are different, it may be possible not to allocate the PSSCH FDMed in the symbol in which the S-SSB is transmitted in FIG. 13. Although FIG. 13 considers allocation to one sub-channel, any other allocation to a plurality of sub-channels may be possible. In addition, no allocation of the S-SSB resource may be possible in a slot to which the PSFCH is allocated. In other words, the PSFCH may not be transmitted in a slot in which the S-SSB can be transmitted and received.

Meanwhile, as described above in description for FIG. 6, types of information transmitted through the PSBCH may include the frame number, the downlink and uplink configuration information, the slot index, and the coverage indicator. However, this may be information limited to sidelink UEs communicating in the licensed band, and sidelink UEs communicating in the unlicensed band may further consider at least one of the following information.

5. Channel access type indicator: This is information indicating whether channel access is performed in the Frame Based Equipment (FBE) scheme or the Load Based Equipment (LBE) scheme. The FBE is the same as semi-static channel access, and the LBE is the same as dynamic-channel access. In the semi-static channel access scheme, the UE attempts channel access through a sensing window set at regular cycles. If channel access is successful, the UE may freely transmit and receive sidelink data during a certain interval, and if channel access fails, the UE waits until the sensing window that exists in the next cycle. In the dynamic-channel access scheme, if there is data to be sent via sidelink, the UE considers a back-off counter. If the value of the back-off counter is 0, the UE attempts channel access, and once the channel access is performed, the UE transmits data. If channel access fails, the UE does not decrease the value of the back-off counter or sets it to a specific value. In order for the back-off counter value to be decreased, the channel must be in an idle state every specific sensing slot (e.g., 9 us). Since the sidelink UE operating in the unlicensed band needs to know how to perform channel access in a region where it is located before performing sidelink communication, the channel access type indicator information may be required.

In the case of the UE communicating in the unlicensed band, since all frames or slots can communicate in uplink, downlink, or sidelink, "downlink and uplink configuration information" provided by the sidelink UE operating in the licensed band via the PSBCH may not be necessary. Also, it may be advantageous for the UE communicating in the unlicensed band to transmit and receive data by attempting to occupy a channel by itself without any help of the base station, and if only the GNSS is prioritized to match a synchronization signal, the coverage indicator information may not be needed.

Figure 14:
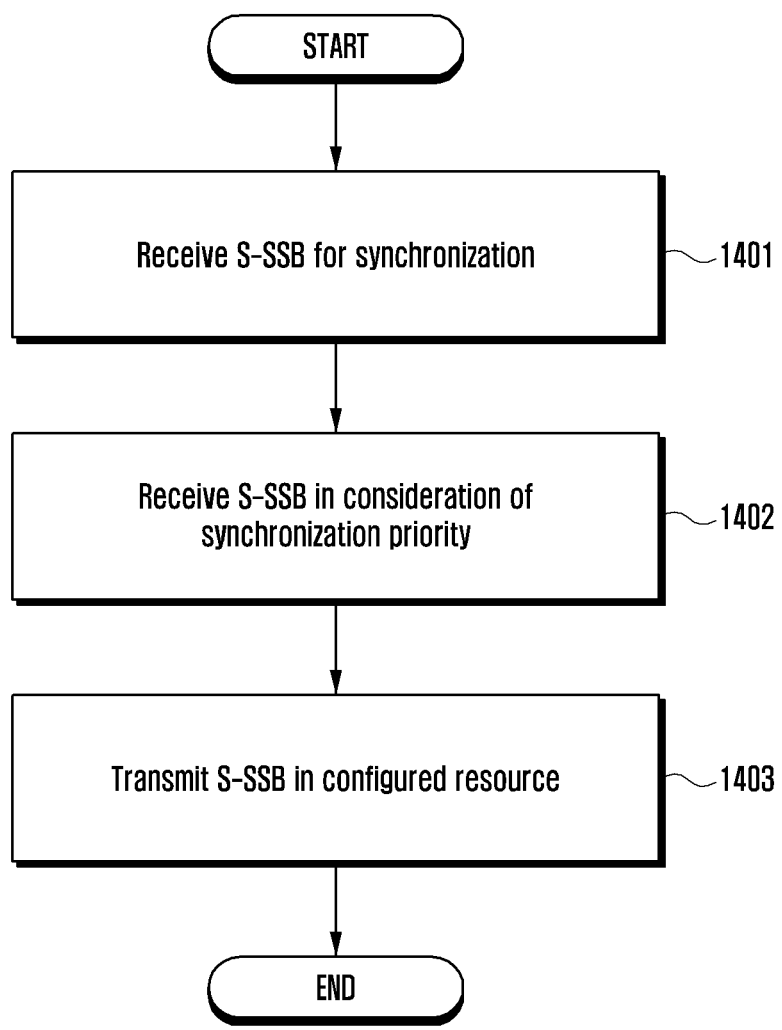
FIG. 14 illustrates an example of an operation flowchart of a sidelink UE operating in an unlicensed band according to an embodiment of the disclosure.

FIG. 14 illustrates an example of an operation flowchart of a sidelink UE operating in an unlicensed band according to an embodiment of the disclosure.

Some of the operations of FIG. 14 may be omitted, and two or more operations may be combined and performed as one step. Also, the operation sequence of FIG. 14 may be changed.

If the sidelink UE operating in the unlicensed band has not synchronized with any synchronization source before transmitting a synchronization signal, it may receive the synchronization signal at operation 1401 in a resource in which the synchronization signal configured by higher layer signaling from a base station or preconfigured is transmitted and received.

If a plurality of synchronization signals are detected, the sidelink UE may select a specific synchronization signal source in accordance with the synchronization prioritization method described above (e.g., synchronization prioritization method 1, synchronization prioritization method 2, synchronization prioritization method 3) and receive the synchronization signal from the selected synchronization signal source at operation 1402.

If the sidelink UE is synchronized with a specific synchronization source, operations 1401 and 1402 may be omitted.

In addition, the sidelink UE may perform S-SSB transmission at operation 1403 in consideration of at least one or any combination of embodiments of the disclosure.

For example, the sidelink UE may identify whether a frequency band in which the UE operates corresponds to an unlicensed band/spectrum or a licensed band/spectrum. The sidelink UE may identify a period for a transmission of a S-SSB and a subcarrier spacing associated with the S-SSB. The sidelink UE may identify a number of S-SSB transmissions within the period. The number of S-SSB transmissions may relate to the subcarrier spacing and depend on whether the frequency band corresponds to the unlicensed spectrum or the licensed spectrum. For same subcarrier spacing, a number of S-SSB transmissions in a case of the unlicensed band/spectrum is greater than a number of S-SSB transmissions in a case of the licensed band/spectrum. The sidelink UE may transmit the S-SSB within the period based on the number of S-SSB transmissions. In case that the frequency band in which the UE operates corresponds to the unlicensed band/spectrum, the sidelink UE may transmit at least two S-SSBs within the period. As an example, in case that the frequency band in which the UE operates corresponds to the unlicensed band/spectrum, the period is 160 ms, and the subcarrier spacing is 15 kHz, the number of S-SSB transmissions may be 2.

The S-SSB transmitted by the sitelink UE may be received by another sidelink UE.

Figure 15:
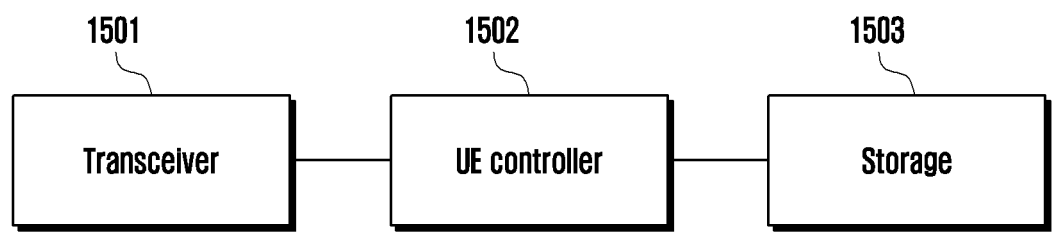
FIG. 15 is a block diagram illustrating a structure of a UE according to an embodiment of the disclosure.

FIG. 15 is a block diagram illustrating a structure of a UE according to an embodiment of the disclosure.

Referring to FIG. 15, the UE may include a transceiver (1501), a UE controller (1502), and a storage (1503). In the disclosure, the UE controller may be defined as a circuit, an application-specific integrated circuit, or at least one processor.

The transceiver (1501) may transmit/receive signals to/from other network entities. For example, the transceiver may receive system information from a base station and may receive a synchronization signal or a reference signal. In addition, the transceiver may transmit/receive signals to/from other UEs.

The UE controller (1502) may control overall operations of the UE according to the embodiments proposed in the disclosure. For example, the UE controller may control a signal flow between blocks to perform operations according to the above-described drawings and flowcharts. Specifically, the UE controller may operate in response to a control signal from the base station and exchange messages or signals with other UEs and/or the base station.

The storage (1503) may store at least one of information transmitted/received through the transceiver and information generated through the UE controller.

Figure 16:
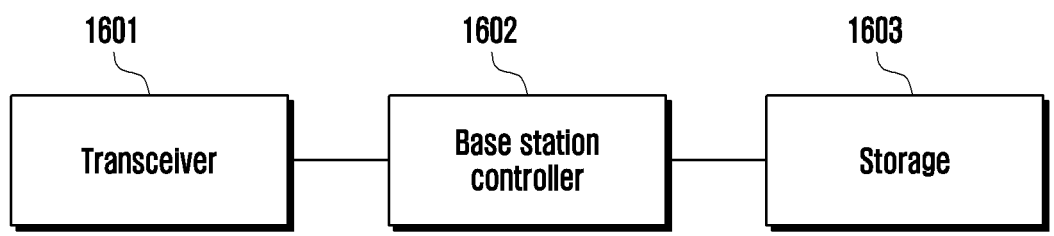
FIG. 16 is a block diagram illustrating a structure of a base station according to an embodiment of the disclosure.

FIG. 16 is a block diagram illustrating a structure of a base station according to an embodiment of the disclosure.

Referring to FIG. 16, the base station may include a transceiver (1601), a base station controller (1602), and a storage (1603). In the disclosure, the base station controller may be defined as a circuit, an application-specific integrated circuit, or at least one processor.

The transceiver (1601) may transmit/receive signals to/from other network entities. For example, the transceiver may transmit system information to a UE and may transmit a synchronization signal or a reference signal.

The base station controller (1602) may control overall operations of the base station according to the embodiments proposed in the disclosure. For example, the base station controller may control operations proposed in the disclosure to manage and reduce interference with neighboring base stations. Specifically, the base station controller may transmit a control signal to the UE to control operations of the UE or exchange messages or signals with the UE.

The storage (1603) may store at least one of information transmitted/received through the transceiver and information generated through the base station controller.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
    identifying that a frequency band in which the UE operates corresponds to an unlicensed spectrum;
    identifying a period for a transmission of a sidelink synchronization signal block (S-SSB) and a subcarrier spacing associated with the S-SSB;
    identifying a number of S-SSB transmissions within the period, for the unlicensed spectrum; and
    transmitting at least one S-SSB based on the number of S-SSB transmissions, in the unlicensed spectrum,
    wherein the number of S-SSB transmissions relates to the subcarrier spacing,
    wherein the number of S-SSB transmissions for the unlicensed spectrum is greater than a number of S-SSB transmissions for a licensed spectrum, and
    wherein transmitting the at least one S-SSB includes:
        identifying whether a first channel access procedure for transmitting a S-SSB fails on a first resource among resources corresponding to the number of S-SSB transmissions for the unlicensed spectrum,
        in case that the first channel access procedure is fails, performing a second channel access procedure on a second resource among the resources corresponding to the number of S-SSB transmissions, and
        in case that the second channel access procedure succeeds, transmitting a S-SSB on the second resource.

2. The method of claim 1,
    wherein the period is 160 ms, and
    wherein in case that the subcarrier spacing is 15 kHz, the number of S-SSB transmissions is 2.

3. The method of claim 1, wherein the S-SSB includes a sidelink primary synchronization signal (S-PSS), a sidelink secondary synchronization signal (S-SSS), and a physical sidelink broadcast channel (PSBCH).

4. The method of claim 3, wherein in case that the frequency band corresponds to the unlicensed spectrum, the PSBCH includes information indicating a channel access type.

5. The method of claim 1, further comprising:
transmitting a physical sidelink control channel (PSCCH) or a physical sidelink shared channel (PSSCH) in symbols other than symbols in which at least one S-SSB is transmitted in a slot.

6. The method of claim 1, wherein the at least one S-SSB is received from a base station or another UE operating in the unlicensed spectrum.

7. A user equipment (UE) in a wireless communication system, the UE comprising:
a transceiver; and
a controller coupled with the transceiver and configured to:
identify that a frequency band in which the UE operates corresponds to an unlicensed spectrum,
identify a period for a transmission of a sidelink synchronization signal block (S-SSB) and a subcarrier spacing associated with the S-SSB,
identify a number of S-SSB transmissions within the period, for the unlicensed spectrum, and
transmit at least one S-SSB based on the number of S-SSB transmissions, in the unlicensed spectrum,
wherein the number of S-SSB transmissions relates to the subcarrier spacing,
wherein the number of S-SSB transmissions for the unlicensed spectrum is greater than a number of S-SSB transmissions for a licensed spectrum, and
wherein, for transmitting the at least one S-SSB, the controller is configured to:
identify whether a first channel access procedure for transmitting a S-SSB fails on a first resource among resources corresponding to the number of S-SSB transmissions for the unlicensed spectrum,
in case that the first channel access procedure is fails, perform a second channel access procedure on a second resource among the resources corresponding to the number of S-SSB transmissions, and
in case that the second channel access procedure succeeds, transmit a S-SSB on the second resource.

8. The UE of claim 7,
wherein the period is 160 ms, and
wherein in case that the subcarrier spacing is 15 kHz, the number of S-SSB transmissions is 2.

9. The UE of claim 7,
wherein the S-SSB includes a sidelink primary synchronization signal (S-PSS), a sidelink secondary synchronization signal (S-SSS), and a physical sidelink broadcast channel (PSBCH), and
wherein, in case that the frequency band corresponds to the unlicensed spectrum, the PSBCH includes information indicating a channel access type.

10. The UE of claim 7, wherein the controller is further configured to:
transmit a physical sidelink control channel (PSCCH) or a physical sidelink shared channel (PSSCH) in symbols other than symbols in which at least one S-SSB is transmitted in a slot,
wherein the at least one S-SSB is received from a base station or another UE operating in the unlicensed spectrum.

* * * * *